INVENTORS.
ROBERT F. MORRISON, JR.
MORTON N. SARACHAN
BY
ATTORNEY

United States Patent Office 3,213,453
Patented Oct. 19, 1965

3,213,453
DIGITAL DIRECTION FINDER UTILIZING BINARY ARRAY
Robert F. Morrison, Jr., and Morton N. Sarachan, Rochester, N.Y., assignors to General Dynamics Corporation, Rochester, N.Y., a corporation of Delaware
Filed May 7, 1963, Ser. No. 278,623
6 Claims. (Cl. 343—113)

This invention relates to an improved direction finder employing digital analysis techniques for indicating the time bearing of an active target relative to the means incorporating said direction finder.

In certain direction finding systems of the prior art, a single pair of antennas is oriented so that the axes of the antenna radiation patterns are angularly displaced by some given amount. The detected output from these two antennas will vary, depending upon the orientation of the target. The accuracy of such systems tends to be limited, however, owing to such factors as antenna radiation pattern irregularities and detector nonlinearities. Other direction finding systems require that the antennas be rotated to some position depending upon the relative location of the target and direction finding system. Such systems involve the usual problems inherent in rotating mechanical equipment and require somewhat elaborate servo-mechanisms.

The system of the invention utilizes electronic frequency and azimuth sensing with fixed electronic components, thereby reducing to a minimum mechanical design problems. The receiving antenna elements may be fixed, nondirectional elements inasmuch as directional sensing is accomplished by phase comparison techniques. In addition, the system of the invention offers advantages of accuracy and ability to handle several signals occurring simultaneously. By applying digital techniques, it is possible to sequentially examine all received signals and determine the direction of the source of such signals at a relatively high speed. The system of the invention is capable of wide band operation and of instantaneous interception of any signal, no matter how short its duration. The entire system may be packaged in a relatively small volume and can be carried on aircraft, for example, without imposing severe restrictions on space and weight. The system of the invention can be carried in ships, land vehicles, or missiles, as well as on aircraft. The invention also can be incorporated at a fixed location.

Other advantages of the invention will be apparent from the description of the invention found in the specification and in the drawings wherein.

Figures 1, 2:
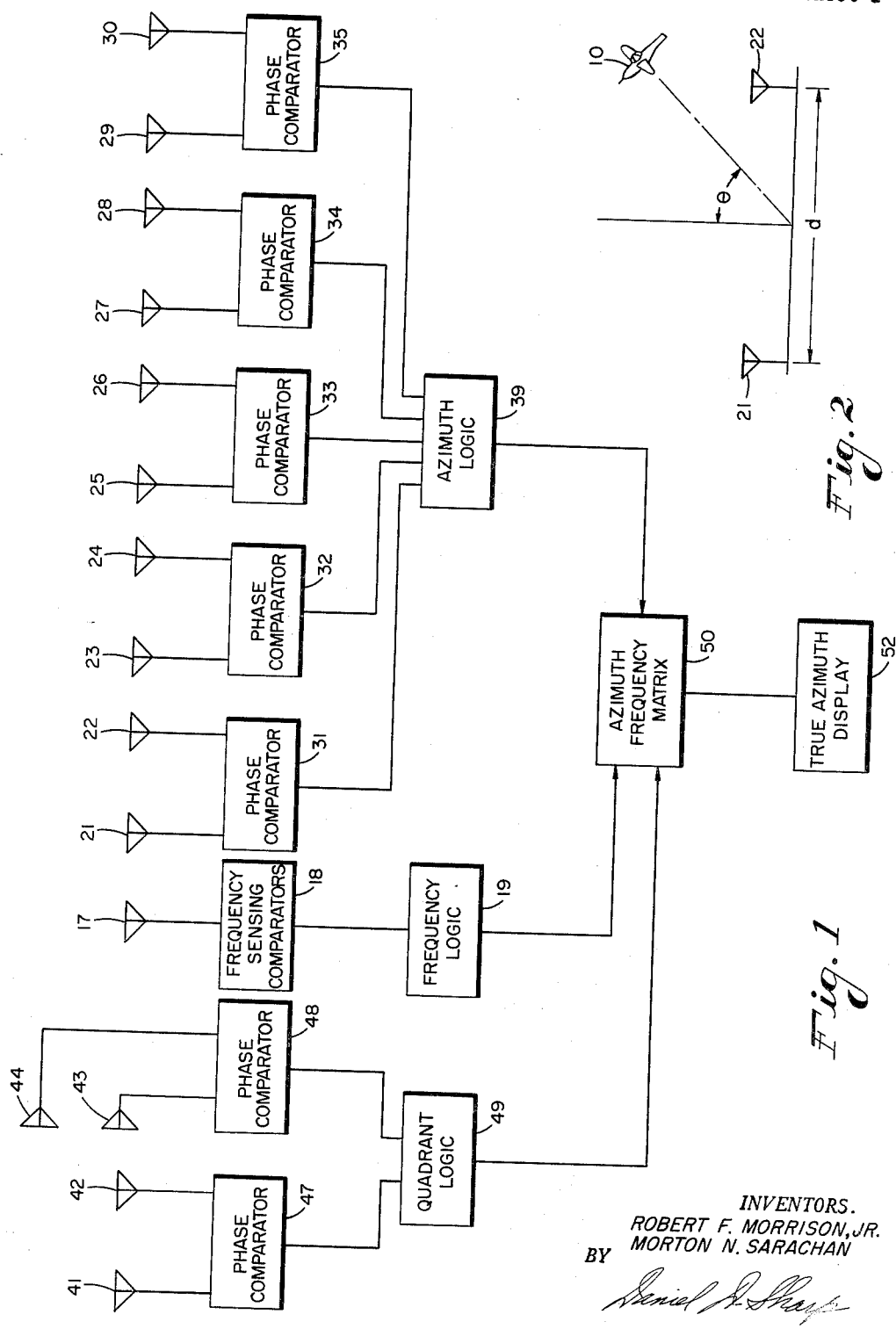
FIG. 1 is a block diagram of a typical embodiment of the invention.
FIG. 2 is a view showing certain spacial relationships involved in bearing determinations.
Figure 3:
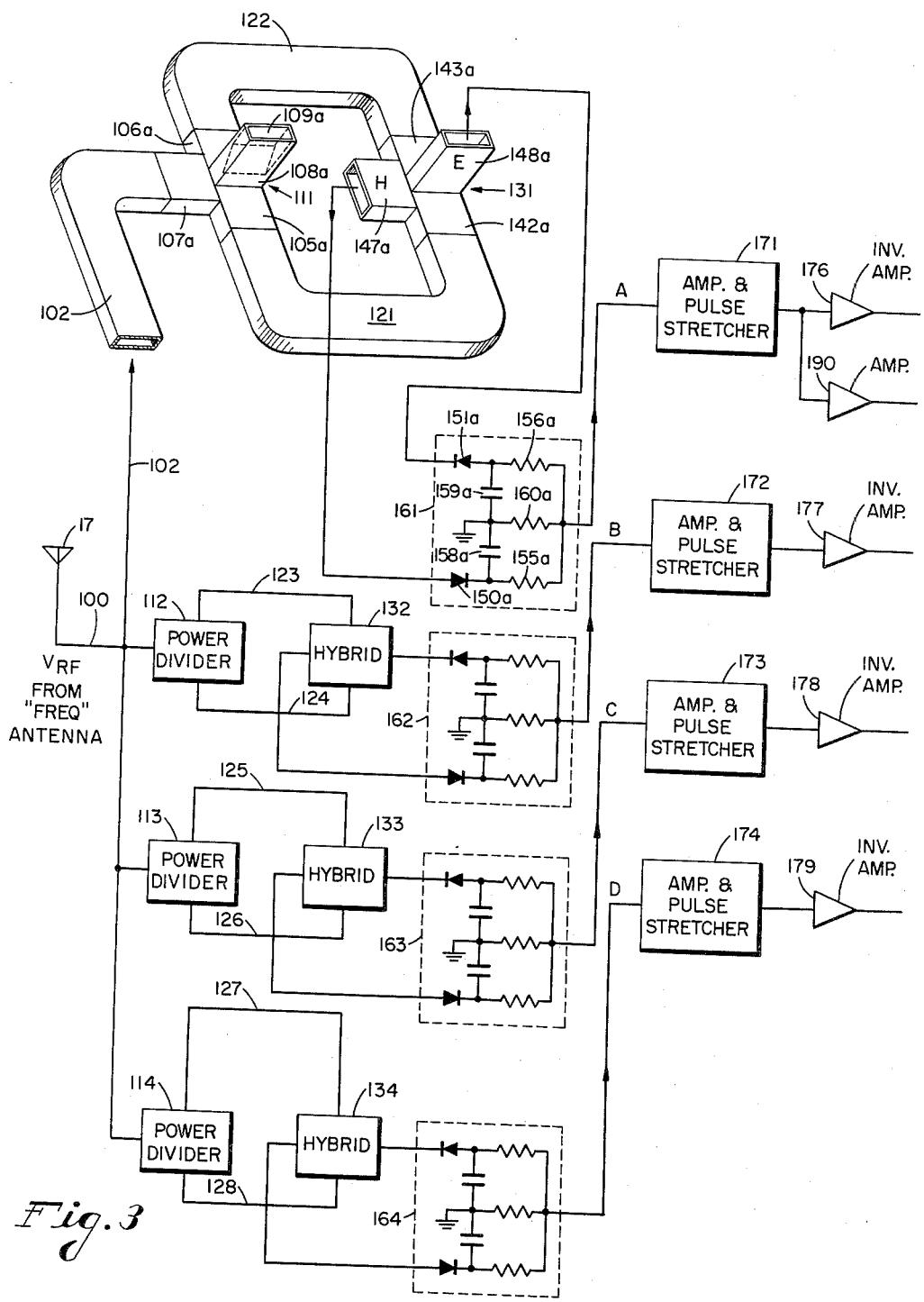
Figure 4:
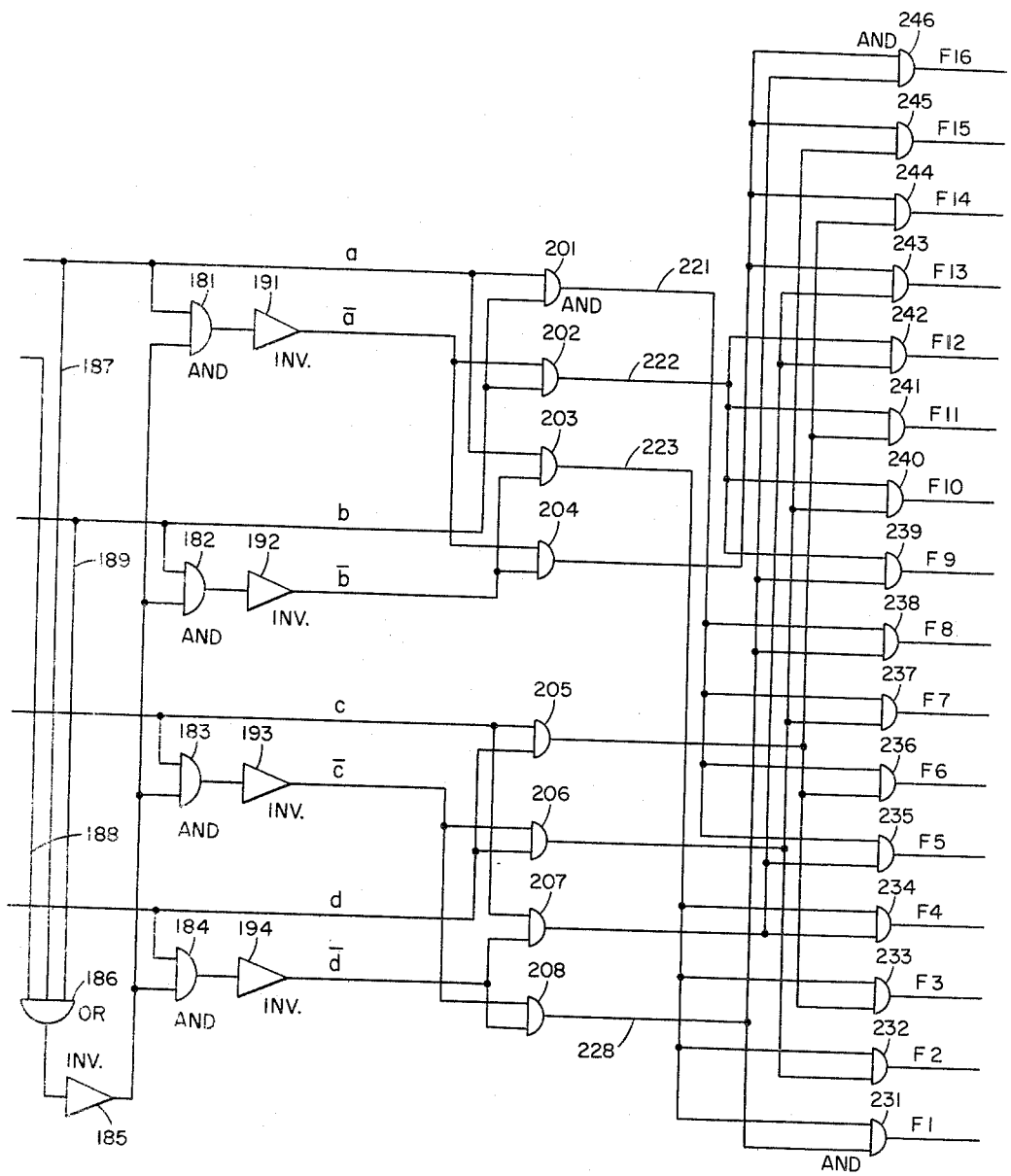
Figure 5:
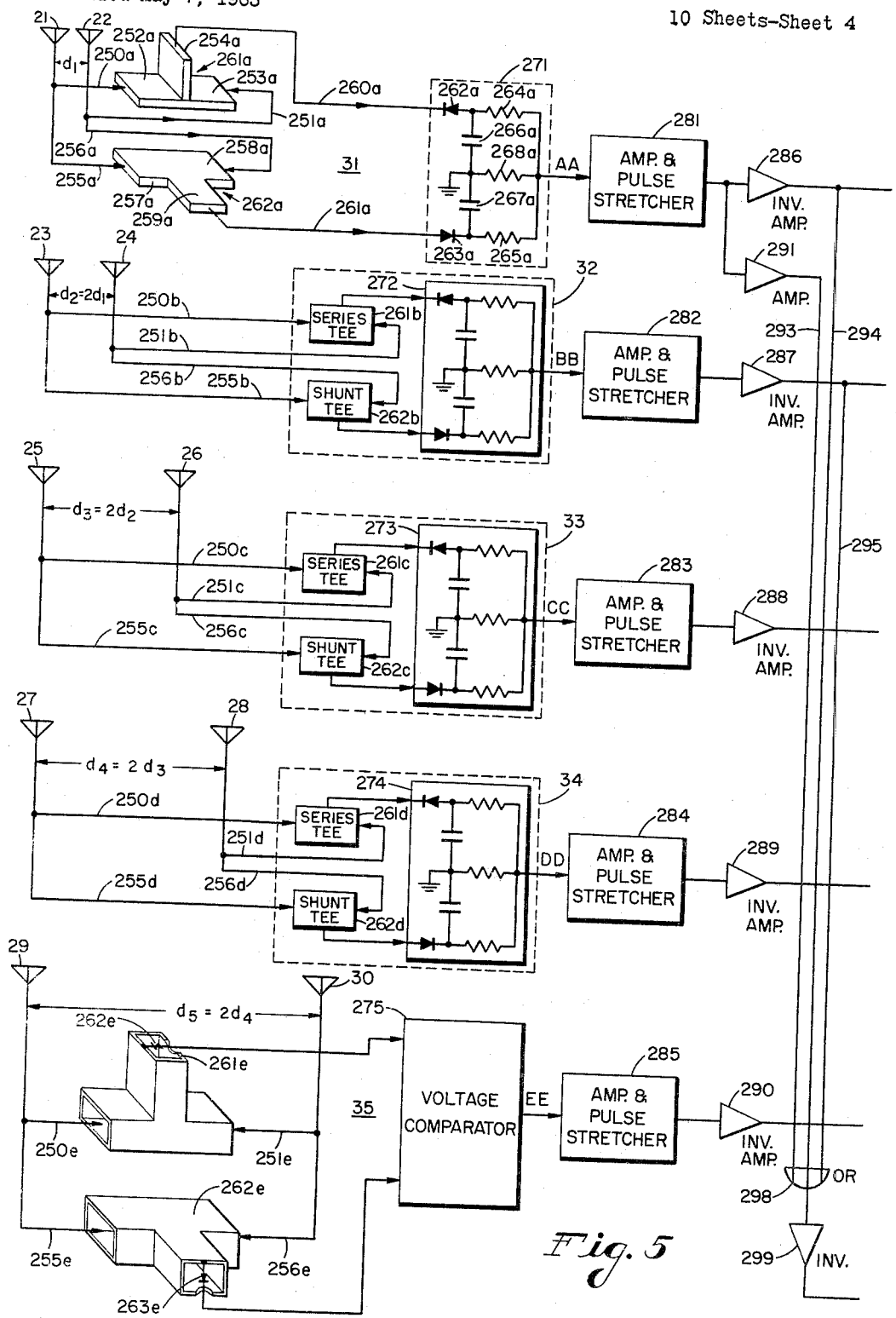
Figure 6:
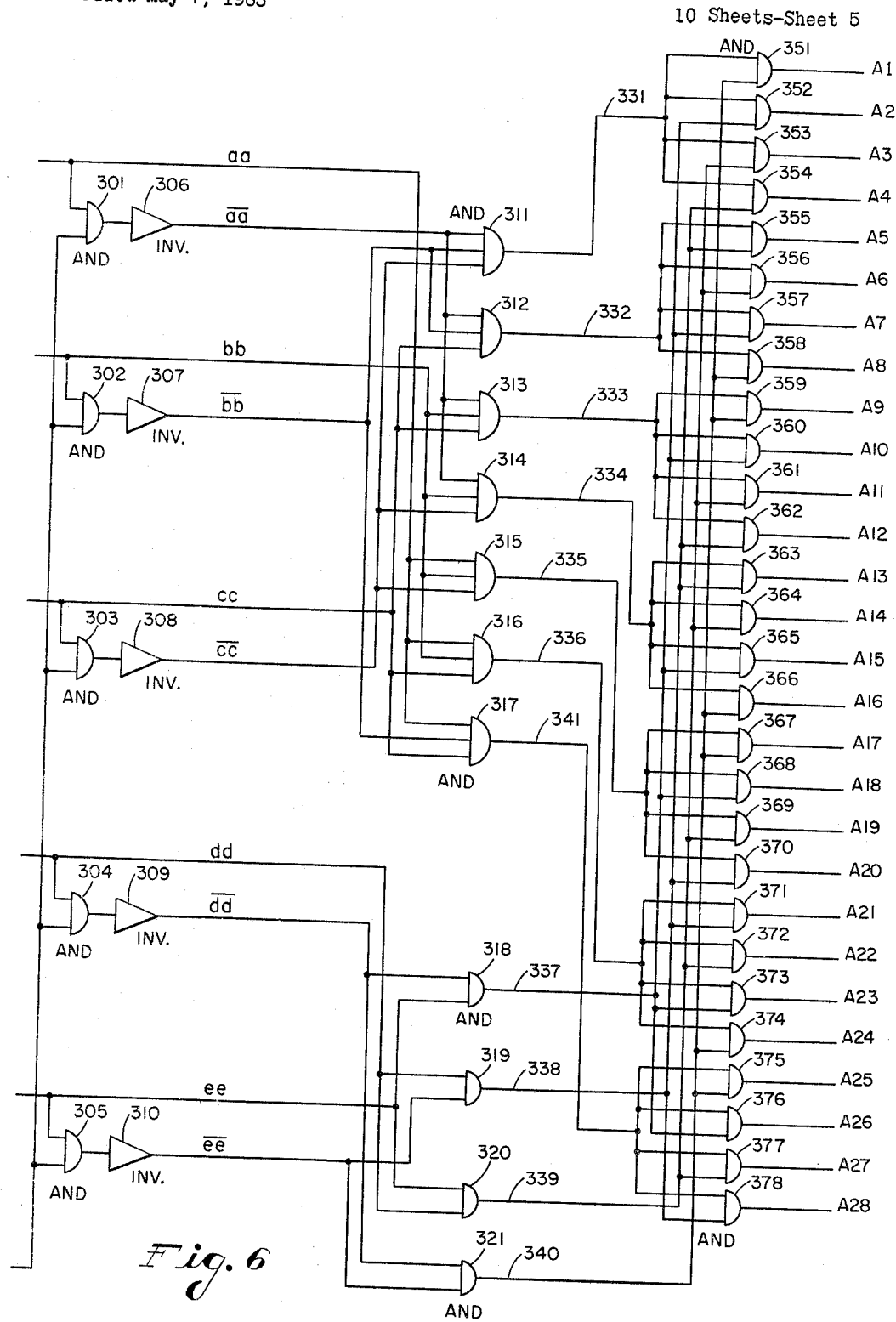
Figure 7A:
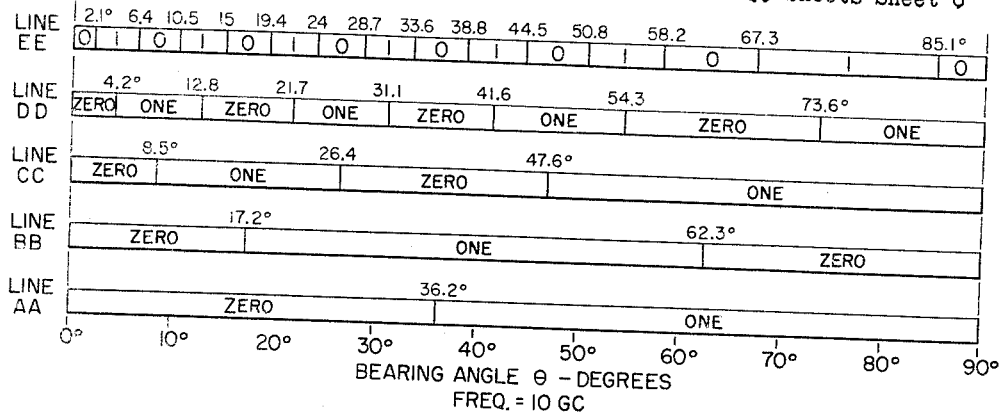
Figure 7B:
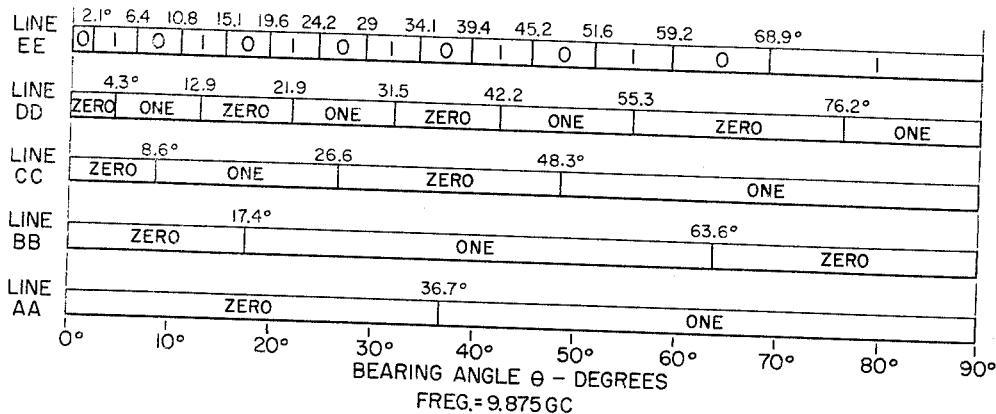
Figure 7C:
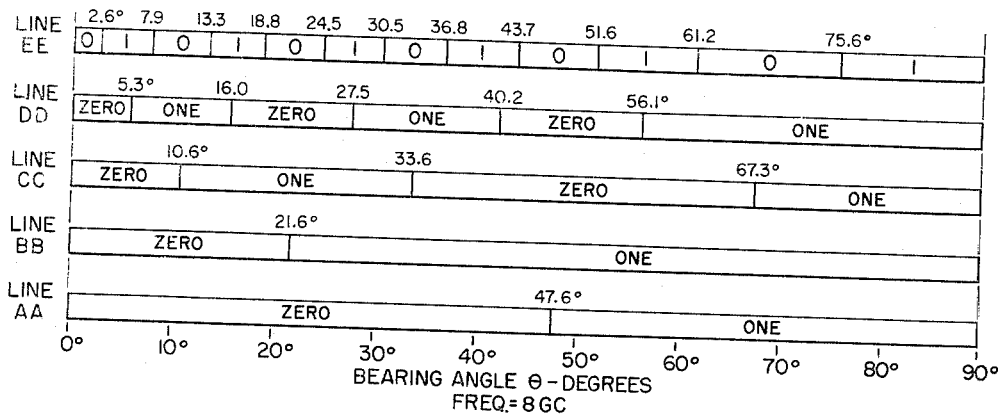
Figure 8:
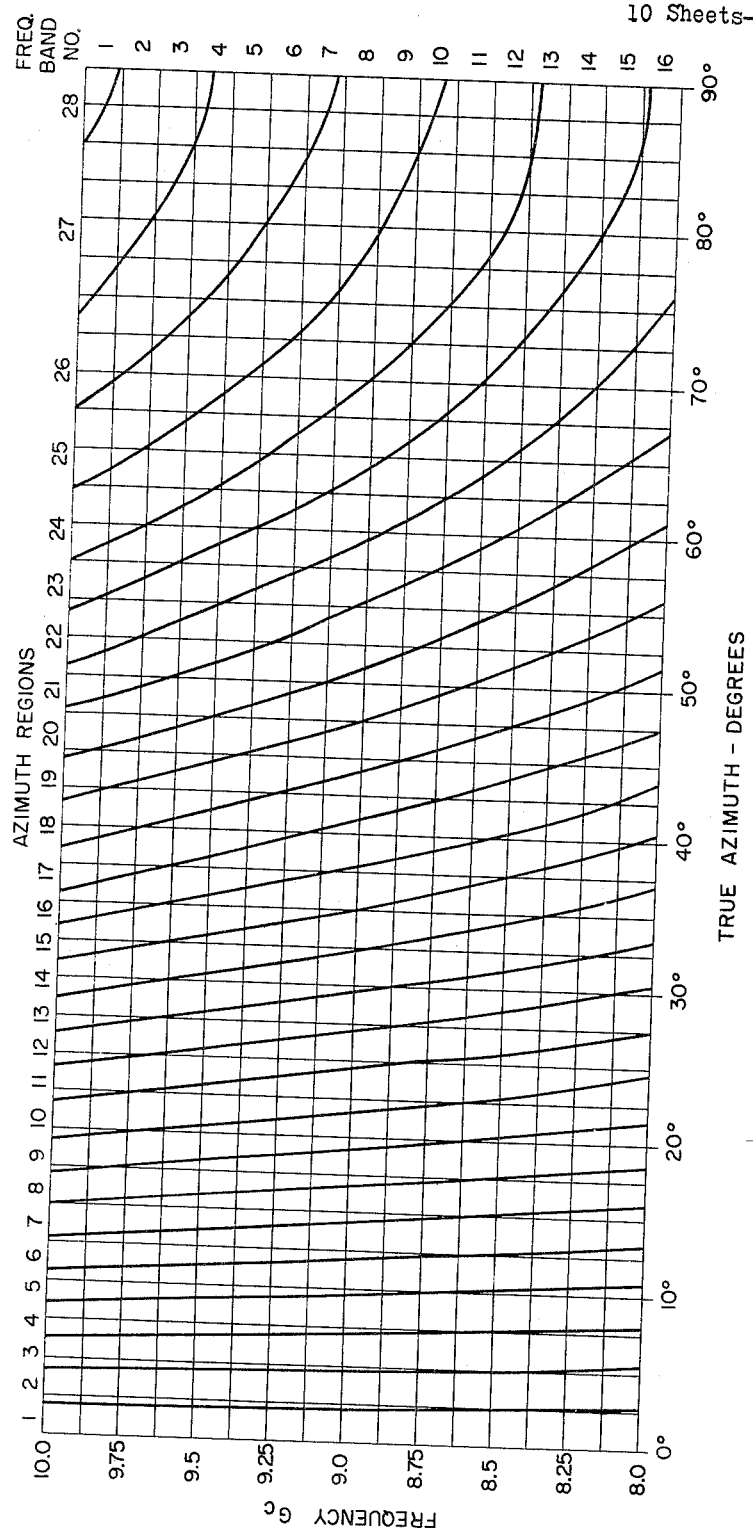
Figure 9:
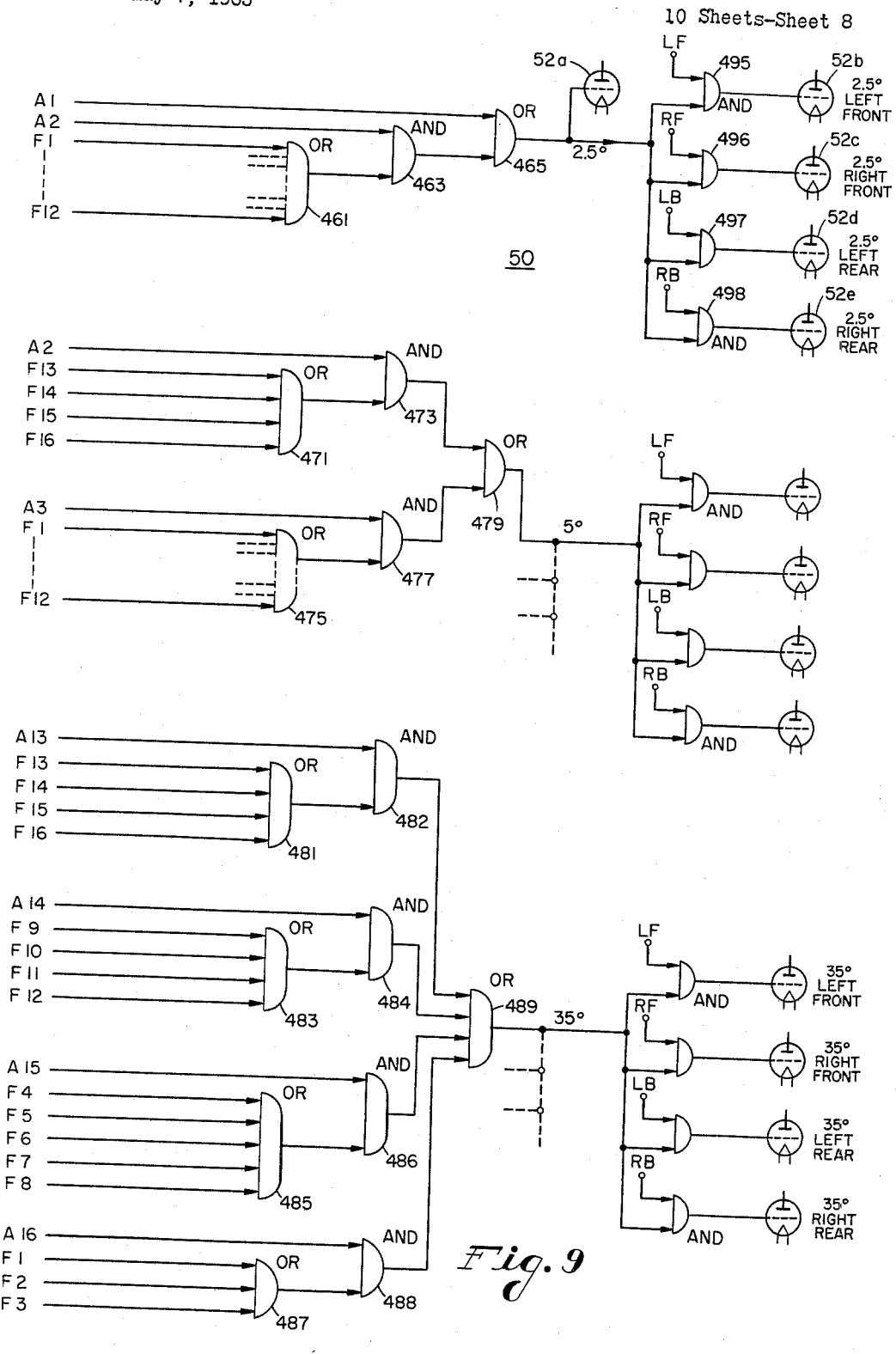
Figure 10:
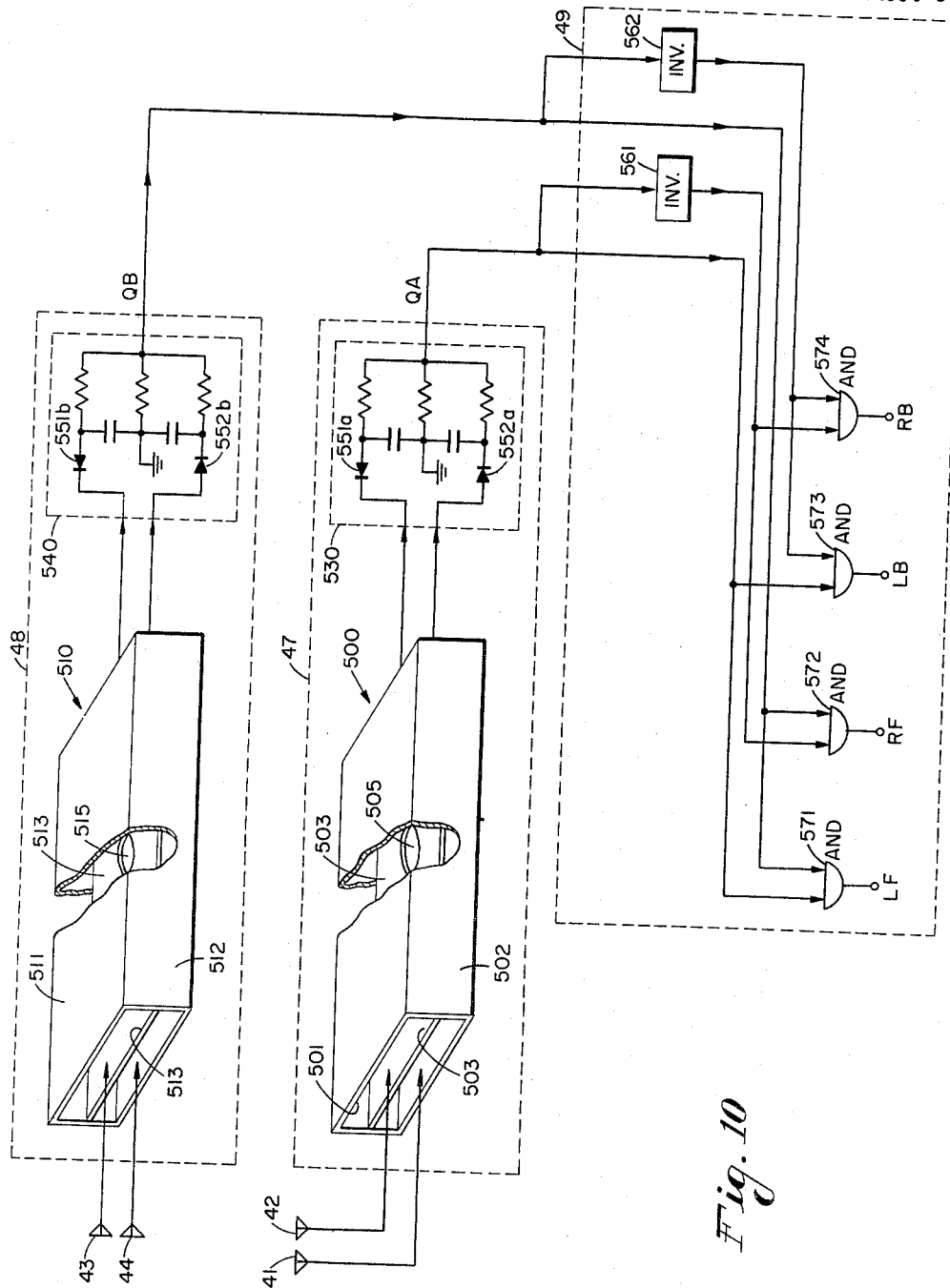
Figure 11:
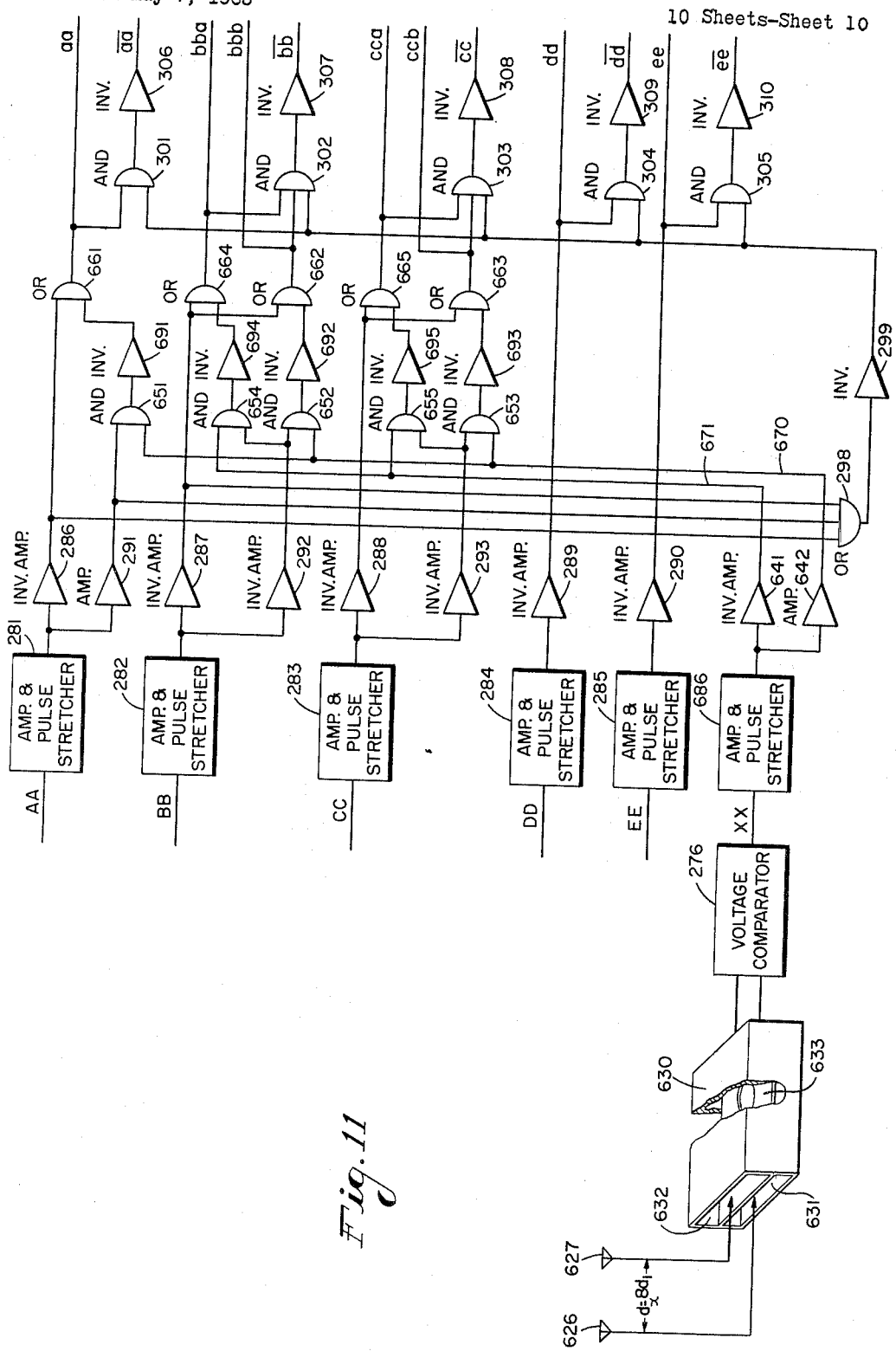

FIGS. 3 and 4 disclose a frequency sensing system of the direction finder of FIG. 1;

FIGS. 5 and 6 disclose an azimuth sensing system of the direction finder of FIG. 1;

FIGS. 7a–7c are charts showing the azimuth zone boundaries for various output lines of the azimuth sensing system, for three different frequencies;

FIG. 8 shows curves indicating several azimuth bands or regions existing over the frequency range of operation corresponding to various true bearings from 0 to 90°;

FIG. 9 is a circuit diagram showing a portion of the correlation modules of the azimuth-frequency correlation matrix 50 shown in FIG. 1;

FIG. 10 is a diagram illustrating the operation of the quadrant sensing portion of the system of FIG. 1; and FIG. 11 is a circuit diagram showing a modification of the azimuth sensing system of FIGS. 5 and 6.

The basic passive azimuth determining system of the invention is illustrated in the block diagram of FIG. 1. The direction finding system may be considered to comprise an azimuth sensing system, a frequency sensing system, a quadrant sensing system, each with accompanying decoding logic circuitry, and an azimuth-frequency correlation matrix supplied with information from the above systems, and a true azimuth display system for providing an indication of the true azimuth belt and quadrant within which the target appears. The complete embodiment illustrated in FIG. 1 and described in the application in detail involves only one frequency band; this band, for purposes of subsequent complete explanation, will be assumed to cover 8 to 10 gigacycles. In certain applications, however, the frequency spectrum of signals from targets to be examined may be too broad for proper operation of the system components shown in FIG. 1. It is necessary then to divide the spectrum into more than one frequency band; in this case, as many systems as the type shown in FIG. 1 are required as there are frequency bands (with the exception that the azimuth display normally would be supplied with information from all of the systems and the frequency sensing systems could be combined). If, for example, a frequency spectrum of 1 gc. to 10 gc. should be desired, three systems might be used covering an octave each and a fourth system, similar to the one described in the application, covering the band from 8 to 10 gc.

In FIG. 1, fifteen antenna elements 17, 21 to 30 and 41 to 44 are shown for the frequency band from 8 to 10 gc. Ten of the fifteen elements, that is, elements 21 to 30, for each frequency band are arranged in pairs to form a binary array. The spacing of the first antenna pair 21, 22 will be of the order of one-half wavelength at the highest frequency in the band, while the spacing of each additional pair 23, 24, etc., will be exactly twice that of the preceding pair. Two pairs of 41, 42, and 43, 44 spaced the same amount as the first pair 21, 22 of the aforesaid binary array are used to determine the quadrant within which the target lies. The antenna 17 is used singly for frequency sensing purposes.

The receiving antenan elements all are nondirectional antennas which need only satisfy the requirements that they be substantialy identical in phase characteristics and capable of responding to any signal within the particular frequency band. When used with aircraft, the antennas may be fixedly mounted on the underside of the aircraft fuselage in a region of minimum curvature. The pairs of antenna elements 21 to 30 may be mounted with the line connecting a pair of antennas perpendicular to the longitudinal axis of the aircraft. The spacing occupied by a complete array of antenna elements necessary for coverage from 1 to 10 gc., for example, may be relatively small and the antenna height need not exceed a quarter-wavelength which, at 1 gc., is approximately three inches.

Referring now to FIG. 2, the direction finding system of the invention makes use of the directional characteristics of the two-element receiving arrays 21, 22 . . . 29, 30 to determine the angle of arrival of received signals. If an incoming signal from a target 10 at wavelength $\lambda$ arrives from a direction other than normal, at the midpoint, to the line connecting a pair of antennas, such as antennas 21 and 22, the phase difference $\phi$ in excitation of the two antennas 21 and 22 will be a function of the separation $d$ of the antennas, the wavelength $\lambda$ of the signal and the bearing angle $\theta$, viz., the angle between a line from the target to the midpoint of the line adjoining the two antennas and a line perpendicular, at the midpoint, to this line adjoining the two antennas. The phase angle in radians is given by the relationship $$\varphi = \frac{2\pi d \sin \theta}{\lambda}$$

If the two antennas are connected to an output transmission line by means of connecting lines of equal length and a shunt T junction, the voltage on the output transmission line will be greatest if the phase angle is zero or an integral multiple of $2\pi$ radians; on the other hand, the voltage will be least when the phase angle is an odd multiple of $\pi$ radians. If the shunt T junction is replaced by a series T junction, the voltage on the output transmission line will be greatest when the phase angle is an even multiple of $\pi$ radians. The bearing angle of a received signal can be derived by making use of the difference in phase of the voltages induced in the various pairs of antenna elements 21 to 30. For example, if the spacing of antenna elements 21 and 22 is one inch at a wavelength of 1.414 inches (8.35 gc.), the output voltage for parallel connection of such antenna elements will be a maximum when the bearing angle is 0° and a minimum when the bearing angle is 45°. On the other hand, if the two antennas 21 and 22 are connected in series, the minimum voltage will be obtained for a bearing angle of 0° and a maximum voltage for a bearing angle of 45°. At a bearing angle of 20.7°, the phase angle is $0.5\pi$ radians and equal voltages will result from both series and parallel connections of the antennas. In this example, it is possible to determine whether the bearing angle is greater or less than 20.7° by comparing the amplitudes of the voltages resulting from series or parallel connection of the receiving antennas. The series and parallel connections for the array 21–30 are incorporated in the phase comparators 31–35 and the series and parallel antenna connections can be achieved by means of series and shunt hybrids connected to each of the antennas of a given pair. The phase comparators 31 to 35 each includes also a voltage comparison circuit including detectors placed in the shunt and series arms of the hybrids to provide a pulse representative of a binary one or a binary zero, depending upon which of the detected voltages is greater. Each pair of antennas 21 to 30 and their associated phase comparators 31 to 35 can be considered as providing one or more groups of angular zones in which greater amplitude is obtained by parallel connection of antenna pairs and one or more groups of angular zones in which greater voltage is obtained by series connection of the antenna pairs. In other words, each zone boundary is the point at which the binary output changes from a binary one to a binary zero, or vice versa. The location of these zone boundaries is a function of the spacing $d$ between antenna elements of a given pair and the wavelength. Since the spacing $d$ varies for each of the antenna pairs, the outputs from the various phase comparators 31 to 35 vary with bearing angle in a different manner. As will be more readily apparent from inspection of FIGS. 7a to 7c, the number of zone boundaries for the antenna pair of largest spacing is greater than the number of zone boundaries for the antenna pair of smallest spacing. Moreover, the zone boundaries overlap in such manner that no two boundaries occur at the same bearing angle. The zones for each of the several antenna pairs and their associated phase comparator constitute, in effect, a binary code which describes the bearing angle; each pair of antennas and their associated phase comparator provides one digit in a binary number which depends upon the bearing angle. The binary number defines the angular region in which the bearing angle falls in an unambiguous manner. The number of digits in the binary number and, hence, the accuracy with which the bearing angle or azimuth is specified, increases with the number of antenna pairs and phase comparators employed. In the azimuth sensing system exemplified in FIGS. 5 and 6, five antenna pairs and a like number of phase comparators are used. The phase comparator binary outputs are coupled to an azimuth logic circuit 39 which serves to provide an output pulse on one only of a plurality of output lines. The particular output line which is energized at any given time depends upon the binary code (number) derived from the combination of phase comparators 31 to 35. For any particular frequency, it can be shown that there is a distinct binary code corresponding to a certain limited range of bearing angles. For example, as will be evident subsequently, the binary code obtained for the bearing range from 0° to 2.1, at 10 gc., is 0 0 0 0 0; while, from 38.8° to 41.6°, at 10 gc., the binary number is 1 1 0 0 1. For the highest target frequencies there is a total of twenty-eight such binary numbers covering the range from 0° to eight such binary numbers covering the range from 0° to 90°. As the frequency decreases, the number of binary numbers necessary for 0° to 90° coverage decreases; this is another way of saying that all twenty-eight output lines are not energized over the entire range of frequencies. Since these azimuth band output lines are actually energized selectively in accordance with a particular bearing angle range, they are referred to as azimuth band lines.

The mathematical relationship previously set forth shows that the location of the zone boundary will vary as a function of frequency. Consequently, the bearing angle designated by a particular binary number varies as a function of frequency. This variation with frequency clearly is evident from a comparison of FIGS. 7a, 7b and 7c. The azimuth band lines, in and of themselves, do not supply true bearing information. The direction finding system must, therefore, include a frequency sensing device and a means for combining the frequency information with the bearing information so as to obtain a true bearing angle corresponding to the binary number obtained from the azimuth sensing circuit.

The frequency sensing portion of the system is similar to that described in a copending application for U.S. Letters Patent of Robert F. Morrison and Morton N. Sarachan, Serial No. 242,674, filed December 6, 1962, and will be described in further detail subsequently. Two types of frequency sensing devices are shown in the copending application, one using a plurality of open and shorted transmission lines, and the other using hybrid junctions. The latter type is illustrated in the subject application, inasmuch as the frequency band being discussed is in the microwave region. The incoming signal at antenna 17 is supplied to an area 18 for frequency sensing comparators which comprise a plurality of hybrid junctions. The incoming signal is supplied to the two input ars of each of said hybrid junctions along paths which differ by a certain length. The differential path lengths for each of the hygrid junctions differ and are arranged in binary sequence. The relative magnitude of the voltages at the output arms of each hybrid junction is a function of the relationship between the differential path length and the wavelength of the applied signals. Voltage comparator circuits coupled to the output arm of each hybrid junction serve to provide either a binary one or binary zero, depending upon which of the output arms have the greater output. By means of the several frequency sensing comparators, a binary number is obtained corresponding to the frequency band. The number of such frequency sensing comparators determines the number of binary digits and, hence, the frequency resolution of the system. By means of appropriate frequency logic circuitry 19, it is possible to derive an output which is representative of the frequency band within which the incoming signal lies. In practice, the lines from the individual frequency sensing comparator circuits, each representing one Gray code digit, will be supplied to the frequency logic circuit 19 and the total frequency range will be decoded into a number of output lines, each representing a predetermined segment of the frequency range. In the example described in FIGS. 3 and 4, the range of 8 to 10 gc. is decoded into sixteen lines each representing a 125 mc. segment of the frequency range.

An azimuth-frequency correlation matrix 50 serves to correlate the decoded azimuth position with respect to frequency. The input will consist of the various frequency line from frequency logic circuit 19 and the various decoded azimuth band lines from azimuth logic circuit 39. By reference to the curves of FIG. 8, which illustrate the extent of each azimuth band (binary code number) for each frequency, it is possible to select various combinations of frequency and azimuth bands which correspond to any selected true bearing belt. The output of correlation matrix 50 will, in the example shown in detail, consist of twenty-eight true azimuth lines, each respresenting a corrected value of azimuth for a specific slot in a 90° sector. Since only one frequency will be sampled at a given instant, the output from the frequency decode logic circuit will appear on one only of the frequency lines which interconnect the frequency logic circuit 19 and correlation circuit 50. Similarly, an azimuth band output will appear on one only of the azimuth band lines interconnecting the azimuth decoded logic circuit 39 and correlation circuit 50. The correlation of these two lines represents the actual azimuth or bearing.

For purposes of illustration, consider a true azimuth of 35°. In FIG. 8, this particular value of azimuth may be derived from any of the following input combinations: azimuth band 13 and frequencies of 8 to 8.375 gc. (frequency band Nos. 14 to 16), azimuth band 14 and frequencies from 8.375 to 9.0 gc. (frequency band Nos. 9 to 13), azimuth band 15 and frequencies from 9.0 to 9.675 gc. (frequency band Nos. 4 to 8), and azimuth band 16 together with frequency bands 1 to 3. As will be shown later, the correlation circuitry may be arranged, consistent with the necessary resolution, so that the azimuth is indicated in small bands of the order of 2.5°. In one correlation scheme, several correlation modules are used; in each such module the various frequency lines from frequency logic circuit 19 corresponding to the frequency bands associated with a given azimuth band are combined in OR gates. The output of each such OR gate is then supplied to an AND gate, the other input to which is the azimuth band line corresponding to the azimuth band associated with the frequency bands previously combined in the OR gate. The various AND gate outputs are supplied to a final OR gate providing the correlation module output signal. Several such correlation modules are used, depending upon the number of segments or belts into which the entire bearing range is to be divided. In the example illustrated in part in FIG. 9 and completely set out subsequently in Table IX, twenty-eight correlation modules are contemplated.

As shown in FIG. 1, the correlation matrix 50 also receives information from the quadrant sensing portion of the system. This portion includes two pairs of antennas 41, 42 and 43, 44, associated phase comparators 47 and 48, and a quadrant logic circuit 49. The purpose of the quadrant sensing circuit is to distinguish between targets located in the four quadrants from 0° to 360°. The first antenna pair 41, 42 and its associated phase comparator 47 will distinguish between targets located in the sector from 0° to +90° and targets from 0° to −90° (viz., 270° to 360°). These are the angular zones on both sides of the perpendicular to the line connecting the antenna elements of pair 41, 42. The antennas 41 and 42 are separated by distance which may be equal to that of the spacing for antenna pair 21, 22 in the azimuth sensing circuit. The antennas are connected to input arms of a directional coupler by transmission lines of equal length. The phase angle between the voltages received by the two antennas 41 and 42 is given by the same relationship mentioned previously in connection with the azimuth sensing circuit. The vector relationships in the directional coupler are such that a greater output will be obtained from the first of two output arms if the phase of the voltage from the first antenna 41 lags that at antenna 42 by less than $\pi$ radians, while the voltage at the second output arm will be greater if the phase of the voltage from antenna 41 leads the voltage at antenna 42. Comparison of the amplitudes of the output voltages of the direction coupler will reveal whether the bearing angle of an incoming signal lies to the right or left of the perpendicular to the line connecting the two antennas. Another pair of antennas 43 and 44 oriented at right angles to antenna pair 41, 42, together with a phase comparator 48, will obviously reveal whether the bearig angle of the incoming signal lies in the angular region of the other two quadrants; that is, from 90° to 180° or from 180° to 270°. By means of quadrant sensing logic circuit 49, output pulses may be derived which indicate within which of the four quadrants lies the target whose bearing angle is being determined.

This information, when combined with the frequency-azimuth correlated information, enables a final output pulse to be obtained which is indicative not only of the true bearing of the target, but also of the quadrant occupied by the target. The final output pulse from the correlation matrix then can be applied to any one of several types of display devices 52. In the example described in FIG. 9, a plurality of visual glow tubes are connected to output lines from the various modules of the correlation matrix 50.

In the particular example described in the application, the resolution of the system tends to degrade at bearing angles of above 60°. In applications wherein better resolution is essential, such resolution can be obtained by using more than one azimuth sensing system each with its own group of azimuth sensing antenna arrays similar to the arrays 21 to 30 shown in FIG. 1. Each of said groups then would be oriented in different phase; for example, two groups of arrays could be oriented 90° relative to one another and the outputs of the azimuth logic circuit 39 from each separate azimuth sensing system combined with frequency data in a correlation matrix 50 would be a modified version of that shown and described in this application. In this manner, excellent resolution over angles from 0° to 45°, 135° to 225° and 315° to 360° would be provided with one azimuth sensing system and the same excellent resolution obtained over angles from 45° to 135° and from 225° to 315° with the other azimuth sensing system.

The frequency determining portion of the system is shown in FIGS. 3 and 4. The signal from the frequency antenna 17 is applied simultaneously to several frequency sensing circuits, each having means capable of distributing the input energy over a pair of wave transmission paths to a hybrid network. By way of example, the hybrid network may be a magic tee having the usual E and H output arms and two collinear input arms receptive of energy transmitted over the respective wave transmission paths. The input signal may be distributed to each hybrid junction by way of a power divider so that the input energy enters the two transmission paths in phase. The transmission lines connecting each power divider and the associated hybrid junction are designed to differ in length by a predetermined amount. Several such frequency sensing circuits are employed, depending upon the required resolution, each having a distinct value of length differential. This differential length for the various frequency sensing circuits may form a binary sequence with each added member of the sequence having an incremental length twice that of the preceding member.

Each hybrid junction is characterized in that energy will appear in the two output arms in accordance with the phase relation of energy incident at the collinear input arms. For a given length differential, the energy level in the H-arm will be either greater than or less than the energy level in the E-arm as the input signal falls within different regions of the frequency spectrum. The energy level of the output arms in each hybrid junction is compared in the associated comparator circuitry to provide either a positive or negative pulse representative of a binary digit. The outputs from the various comparator circuits in sequence provide a binary number or code which can be used to energize selectively one only of several frequency output lines.

As shown in FIGS. 3 and 4, input RF energy is supplied by means of appropriate waveguides 102 to four power dividers 111 to 114. In order to conserve space, only the first power divider 111 and its associated microwave components is illustrated in FIG. 3. The power divider 111 consists of a waveguide hybrid junction of the magic tee type having collinear arms 105a and 106a, an H-arm 107a and an E-arm 108a. An impedance matching element 109a, such as a resistive power absorbing wedge, is positioned in E-arm 108a. The power divider 111 is such that energy applied to H-arm 107a divides equally in arms 105a and 106a; furthermore, the energy in the later two arms is in phase. It should be understood that any type of power divider capable of directing power of equal magnitude and like phase into two separate transmission paths may be used. Power dividers 112 to 114 are identical with power divider 111 and corresponding portions thereof will be referred to in the specification by the same reference numerals accompanied by the letters b, c and d, respectively; these power dividers 112 to 114 are represented schematically in FIG. 3.

Energy is transmitted from arms 105a and 106a of power divider 111 by means of waveguides 121 and 122, respectively, to corresponding collinear arms 142a and 143a of magic tee 131. The H-arm 147a and E-arm 148a of magic tee 131 have diodes 150a and 151a, respectively, mounted in the transverse planes thereof. These diodes actually are not shown in the waveguides in FIG. 3 because of the small size; inasmuch as these diodes form a part of the external voltage comparator circuit 161, they are illustrated within the confines of circuit 161. Although the diodes 150a and 151a usually are mounted physically within the respective H and E arms of magic tee 131, these diodes may be mounted within waveguides attached to the respective output arms 147a and 148a of magic tee 131. When RF energy appears in arms 147a and 148a of the magic tee 131, a voltage is derived across each of the corresponding diodes 150a and 151a. In addition to these diodes, the voltage comparator circuit 161 includes a pair of resistors 155a and 156a, a pair of capacitors 158a and 159a, and a common load resistor 160a.

A positive or negative pulse is derived on output line A of comparator circuit 131, depending upon the relative magnitude and sense of the two input voltages to the comparator circuit. The voltages being compared in circuit 131 are the voltages sensed by diode detectors 150a and 150b placed in the H and E arms of magic tee 131.

For purposes of explanation, it will be assumed that the frequency range of energy received by the system of the invention varies from 8 gc. to 10 gc. and that this frequency range is to be divided into sixteen bands of 125 mc. width. In order to provide a code which changes every 125 megacycles, it is necessary to provide for a differential length of the two transmission paths 121 and 122 which changes by λ/4 for each 125 mc. at the last comparator 164 and by λ/4 for each 1000 mc. at the first comparator 161. It has been found that this may be accomplished by making the length of waveguide 121 greater than the length of waveguide 122 by an amount $\Delta L_1$ equal to three guide wavelengths at a frequency of 12 gc. If equal energy enters branches 142a and 143a in phase, all of this energy will appear in H-arm 147a and none will appear in E-arm 148a. In this case, an output voltage is sensed by diode 150a which will render the latter conductive and result in electron flow through diode 150a to ground, from left to right through common resistor 160a and through resistor 155a, thereby providing a positive pulse on output line A of comparator circuit 161. The time constant of the circuit including resistor 155a and capacitor 158a is large compared with the frequency of the input signal so that the waveform of the output voltage at line A of comparator 161 is approximately a rectangular pulse. This positive pulse can be made to represent a binary zero. If equal energy enters branches 142a and 143a in phase opposition, all such energy will appear in the E-arm 148a and none in the H-arm 147a. In this case, diode 151 only will sense a voltage and this diode alone will conduct. Electrons flowing through diode 151a, resistor 156a, thence from right to left to common resistor 160a to ground will be in such a direction as to produce a negative pulse across resistor 160a, which pulse corresponds to a binary one. The values of resistor 156a and capacitor 159a are such that a long time constant is provided. Finally, if energy entering arm 142a of magic tee 131 is $90n°$ out of phase with energy entering arm 143a, where $n$ is any odd integer, the energy in H-arm 147a is in phase with, and equal in magnitude to, the energy in E-arm 148a. Both diodes 150a and 151a sense voltages of equal magnitude and both will conduct equally. Current will flow in common resistor 160a of comparator 161 in opposite directions and the resultant current flow in resistor 160a will be substantially zero. The voltage available at comparator output line A then will be a null; the frequency for which this condition exists may be referred to as a crossover frequency. Since the output from comparator 161 depends upon the relative phase of energy arriving at branches 142a and 143a of magic tee 131, and inasmuch as the relative phase of this energy depends upon the difference $\Delta L_1$ in length of waveguides 121 and 122, the waveguide 122 could have been made longer than waveguide 121 without affecting operation of the comparator device.

If it is assumed that the highest operating freqency is 10 gc., the difference in length $\Delta L_1$ of the two transmission paths 121 and 122 will be ten-twelfths of three guide wavelengths of five-halves guide wavelengths for this frequency. Energy from power divider 111 thus enters arms 142a and 143a of magic tee 131 in phase opposition. In other words, all of the energy appears at E-arm 148a and a negative voltage pulse representative of a binary one is obtained on line A of comparator circuit 161. At 9 gc., the difference in length $\Delta L_1$ of waveguides 121 and 122 becomes equal to three-fourths of three wavelengths or nine-fourths wavelength and energy thus enters arm 142a of magic tee 131 out of phase by 90° with energy entering arm 143a. The energy available at H-arm 147a then is equal in magnitude, and in phase with, energy in E-arm 148 and the voltage at output line A will then be a null. That is to say, 9 gc. represents a crossover frequency. For the frequency range between 9 gc. and 10 gc., the energy in E-arm 148a will predominate over that in H-arm 147a and a binary one appears at output line A. At 8 gc., $\Delta L_1$ becomes eight-twelfths of three wavelengths or two wavelengths long, and energy entering arms 142a and 143a is in phase. All the energy now is in H-arm 147a and a positive pulse, representing a binary zero, is obtained on comparator output line A. For frequencies between 8 gc. and 9 gc., the energy in H-arm 147a predominates and a binary zero is obtained.

Input energy is supplied to the input arm 107b of a second power divider 112 which includes collinear output arms 105b and 106b and an arm 108b within which an impedance matching termination 109b is disposed. Energy from arms 105b and 106b is supplied to input arms 142b and 143b of magic tee 132 by way of respective waveguides 123 and 124. The difference in length $\Delta L_2$ of waveguides 123 and 124 is made equal to six wavelengths (twice the length $\Delta L_1$) at a frequency of 12 gc. At 10 gc., $\Delta L_2$ is ten-twelfths of six wavelengths or five wavelengths and energy enters arms 142b and 143b of magic tee 132 in phase. An output thus is derived from H-arm 147b and diode 150b of comparator circuit 162 will conduct. Current flowing through common resistor 160b of comparator circuit 162 will produce a positive voltage at output line B, representative of a binary zero. At 9.5 gc., $\Delta L_2$ becomes nineteen-fourths of a wavelength and the phase relationship of energy entering the input arms of magic tee 132 is an odd multiple of 90°. Diodes 150b and 151b then conduct equally and a null is obtained at output line B of comparator 162. Between 9.5 gc. and 10 gc., energy in H-arm 147b will predominate over energy in E-arm 148b, so that a binary zero is obtained at output line B. At 9 gc., $\Delta L_2$ becomes nine-halves wavelengths and the phase difference of energy in arms 142a and 143b is an odd multiple of 180°. In this case of phase opposition, energy appears only in E-arm 148b, diode 151b is the only conducting diode in comparator 162 and a binary one is obtained on output line B. At 8.5 gc., $\Delta L_2$ becomes seventeen-fourths wavelengths long and energy in arms 142b and 143b of magic tee 132 is an odd multiple of 90° out of phase; this is the condition for a null in comparator 162 and another crossover frequency is obtained. At 8 gc., $\Delta L_2$ is four wavelengths long and energy is in phase in both collinear arms 142b and 143b of hybrid 132. A binary zero therefore is obtained at output line B. Between 9.5 gc. and 10 gc., as well as between 8 gc. and 8.5 gc., the H-arm output of hybrid 132 is greater than the E-arm output and a binary zero is derived. A binary one is obtained between 8.5 gc. and 9.5 gc. since the energy level at E-arm is greater than that at the H-arm.

Input energy is supplied also to power dividers 113 and 114 by way of transmission paths 125 and 126 and paths 127 and 128 to hybrid networks 133 and 134, all respectively. These components are similar to the ones previously described and, again, are shown only schematically in FIG. 3. Diodes 150c and 151c are mounted within the H and E arms, respectively, of magic tee 133, while diodes 150d and 151d are mounted within the H and E arms, respectively, of magic tee 134. The differential length $\Delta L_3$ in waveguides 125 and 126 is made equal to twelve wavelengths at 12 gc. The power divider 114 is coupled to the input arms of magic tee 134 by way of waveguides 127 and 128 which differ in length by twenty-four wavelengths at 12 gc. ($\Delta L_4 = 24$).

The comparator circuit 163 associated with magic tee 133 is similar to the voltage comparator circuits previously described and output pulses are derived on output line C in accordance with the following table.

Table I

| Frequency (gc.) | $\Delta L_3/\lambda$ | Phase Relation of Energy in H and E Arms of Magic Tee 133 | Output Energy At Magic Tee 133 | Binary Output on Line C of Comparator 163 |
|---|---|---|---|---|
| 10 | 10 | In phase | H-arm only | Zero. |
| 9.75 | 39/4 | Phase quadrature | H-arm=E-arm | Null. |
| 9.5 | 19/2 | Phase opposition | E-arm only | One. |
| 9.25 | 37/4 | Phase quadrature | H-arm=E-arm | Null. |
| 9.0 | 9 | In phase | H-arm only | Zero. |
| 8.75 | 35/4 | Phase quadrature | H-arm=E-arm | Null. |
| 8.5 | 17/2 | Phase opposition | E-arm only | One. |
| 8.25 | 33/4 | Phase quadrature | H-arm=E-arm | Null. |
| 8.0 | 8 | In phase | H-arm only | Zero. |

It can be readily shown that output pulses are derived on output line D of comparator circuit 164 in accordance with the following Table II.

Table II

| Frequency (gc.) | $\Delta L_4/\lambda$ | Output Energy at Magic Tee 134 | Binary Output on Line D of Comparator 164 |
|---|---|---|---|
| 10.0 | 20 | H-arm only | Zero. |
| 9.875 | 79/4 | H-arm=E-arm | Null. |
| 9.75 | 39/2 | E-arm only | One. |
| 9.625 | 77/4 | H-arm=E-arm | Null. |
| 9.50 | 19 | H-arm only | Zero. |
| 9.375 | 75/4 | H-arm=E-arm | Null. |
| 9.25 | 37/2 | E-arm only | One. |
| 9.125 | 73/4 | H-arm=E-arm | Null. |
| 9.0 | 18 | H-arm only | Zero. |
| 8.875 | 71/4 | H-arm=E-arm | Null. |
| 8.75 | 35/2 | E-arm only | One. |
| 8.625 | 69/4 | H-arm=E-arm | Null. |
| 8.50 | 17 | H-arm only | Zero. |
| 8.375 | 67/4 | H-arm=E-arm | Null. |
| 8.25 | 33/2 | E-arm only | One. |
| 8.125 | 65/4 | H-arm=E-arm | Null. |
| 8.0 | 16 | H-arm only | Zero. |

It is now possible to set up a Table III showing the binary code numbers for each input frequency band.

Table III

| Frequency Band No. | Frequency (gc.) | Hybrid Output Voltages | | | |
|---|---|---|---|---|---|
| | | 1 | 2 | 3 | 4 |
| 16 | 8.00–8.125 | 0 | 0 | 0 | 0 |
| 15 | 8.125–8.25 | 0 | 0 | 0 | 1 |
| 14 | 8.25–8.375 | 0 | 0 | 1 | 0 |
| 13 | 8.375–8.5 | 0 | 0 | 1 | 1 |
| 12 | 8.5–8.625 | 0 | 1 | 1 | 0 |
| 11 | 8.625–8.75 | 0 | 1 | 1 | 1 |
| 10 | 8.75–8.875 | 0 | 1 | 0 | 1 |
| 9 | 8.875–9.00 | 0 | 1 | 0 | 1 |
| 8 | 9.00–9.125 | 1 | 1 | 0 | 0 |
| 7 | 9.125–9.25 | 1 | 1 | 0 | 0 |
| 6 | 9.25–9.375 | 1 | 1 | 0 | 1 |
| 5 | 9.375–9.5 | 1 | 1 | 1 | 1 |
| 4 | 9.5–9.625 | 1 | 0 | 1 | 0 |
| 3 | 9.625–9.75 | 1 | 0 | 1 | 0 |
| 2 | 9.75–9.875 | 1 | 0 | 0 | 1 |
| 1 | 9.875–10 | 1 | 0 | 0 | 0 |

The digital code thus obtained may be converted into analog information by circuitry shown in FIGS. 3 and 4. This circuit also includes means for resolving an ambiguity present at crossover frequencies and an ambiguity normally occurring whenever the code consists entirely of zeros.

It is evident from Table III that an ambiguity exists in the case of an input frequency located at the end of a given band or at the beginning of the next band. This ambiguity occurs whenever there is a crossover frequency and can be eliminated by circuitry to be described. For example, if the input signal frequency is exactly 9 gc., a possibility exists that either the code 0 1 0 0 or 1 1 0 0 might be selected for this crossover frequency. The circuit for resolving ambiguities at crossover frequencies is shown in FIGS. 3 and 4. A positive pulse appears on lines a, b, c and d whenever a binary one (negative pulse) appears at respective comparator output lines A, B, C and D; on the other hand, if a binary zero (positive pulse) appears at comparator output lines A to D, the respective lines a to d do not carry a pulse. Furthermore, positive pulses appears on "not" lines $\bar{a}$, $\bar{b}$, $\bar{c}$ and $\bar{d}$ whenever a zero appears at respective output lines A, B, C and D, while lines $\bar{a}$ to $\bar{d}$ do not carry pulses when the corresponding comparator lines A to D carry a binary one. In other words, a positive pulse on any one of lines a to d corresponds to a binary one, while a positive pulse on any one of $\bar{a}$ to $\bar{d}$ corresponds to a binary zero. The output lines A to D of comparator circuits 161 to 164 are connected to respective amplifier and pulse stretcher devices 171 to 174 that provide suitable amplification of the respective comparator output pulses and provide sufficient pulse length for proper operation of the subsequent gate circuits. The amplified pulses from comparator output lines A to D are supplied to inverter-amplifier stages 176 to 179 which amplify only negative pulses and provide positive pulses on respective lines $a$, $b$, $c$ and $d$ whenever a negative pulse (binary one) appears at the corresponding comparator output line. Inverter-amplifier stages 176 to 179 do not respond to a positive voltage pulse (binary zero), so that no pulse appears on lines $a$, $b$, $c$ and $d$ for a binary zero.

The circuitry of FIG. 4 includes a plurality of two input AND gates 181 to 184. One of the inputs to each of these AND gates is a negative pulse received from inverter 185. An OR gate 186 supplies positive pulses which may appear on lines 187 to 189 to inverter 185. For reasons which will soon appear, it is desirable to supply positive pulses through OR gate 186 to inverter 185, regardless of the frequency of the input signals, so that one input circuit for each of AND gates 181 to 184 can be energized by negative pulses. As previously mentioned, the inverter-amplifier stage 176 operates only upon a negative pulse (binary one). Any negative pulses appearing on comparator output line A are inverted into positive pulses by inverter-amplifier 176. Amplifier 190 operates only on positive pulses and will amplify the binary zero if it should occur on output line A. As indicated in Table III, there will always be either a positive pulse or a negative pulse on line A, except when the input frequency is 9 gc., which, in the example shown, is the crossover frequency for the first hybrid 131. For input frequencies lying within bands 9 to 16, inclusive, there will be a positive pulse on line A which will be amplified by amplifier 190 and transferred by way of line 188 to OR gate 186. For input signals of frequency lying within frequency bands numbered 1 to 8, there will be a negative pulse on line A which will be amplified and converted to a positive pulse in inverter-amplifier 176 and transferred by line 187 to OR gate 186. At 9 gc., there will be a null on line A; therefore, no output will be derived from either amplifier 190 or inverter-amplifier 176. However, there must be either a binary one or a binary zero on all other comparator output lines B to D at 9 gc., since none of the crossover frequencies coincide. As indicated in Table III( the code digit for comparator output line B is a binary one at 9 gc. Such a negative pulse, after inversion in inverter-amplifier 176, can be carried by line 189 to OR gate 186. At least one of the three lines 187 to 189 will supply a positive pulse to OR gate 186 so long as the input signal lies within the operating range of the system. The positive input to OR gate 186 which is transmitted by line 189 is also necessary in the event that the binary code at comparator output lines A to D consist entirely of zeros—as in the frequency range from 8 to 8.125 gc.

It is now evident that there is always a positive pulse from OR gate 186 for each input signal pulse and this positive pulse after inversion to a negative pulse serves as one input to each of negative AND gates 181 to 184. The other input for each of AND gates 181 and 184 consists of any available positive pulse on a given one of corresponding lines $a$, $b$, $c$ and $d$. Gates 181 to 184 are characterized in that they are inhibited during the presence of a positive input pulse from the corresponding one of lines $a$, $b$, $c$ and $d$. Whenever a binary one appears at the output of a given comparator circuit, a positive pulse from the corresponding one of lines $a$ to $d$ and a negative pulse from inverter 185 appears at the inputs to a corresponding one of gates 181 to 184. In this event, the particular gate receptive of the positive pulse is inhibited and no output appears at that gate; therefore, no output exists on the corresponding one of output lines $\bar{a}$ to $\bar{d}$. If either a null or a binary zero appears on a given comparator output line, the inputs to the corresponding gates 181 to 184 consist of negative pulses derived from inverter 185 and a negative voltage from a given line $a$ to $d$. The corresponding one of AND gates 181 to 184 then is open and a negative pulse appears at the output of the corresponding one of these gates. After inversion by the corresponding one of inverters 191 to 194, a positive pulse appears on that one of lines $\bar{a}$ to $\bar{d}$ associated therewith.

By way of example, if a binary one or negative pulse appears at output line A, a positive pulse appears on line $a$. This positive pulse inhibits gate 181 so that line $\bar{a}$ carries no pulse. If there should be a null on comparator output line B, for example, there will be no output on line $b$; moreover, there will be only a negative input voltage at gate 182 and this gate will be opened to provide a negative pulse at its output. This negative pulse from gate 182, after inversion, will appear on line $\bar{b}$ as a positive pulse. If a negative pulse (binary one) appears at output line C, a positive pulse appears on line $c$, gate 183 is inhibited and line $\bar{c}$ carries no pulse. If a positive pulse or binary zero appears on comparator output line D, it will not be amplified by inverter-amplifier 179 and there will be no output on line $d$. The presence of a negative input pulse at gate 184, unaccompanied by any positive pulse from line $d$, will result in a negative pulse appearing at the output of gate 184. This negative pulse, after inversion by inverter 194, will appear as a positive pulse on line $\bar{d}$. It is now evident that a positive output pulse appears on a given one of lines $\bar{a}$ to $\bar{d}$ whenever either a null or a binary zero is available at a corresponding output line A to D.

Referring again to the previous illustration of an input signal at exactly 9 gc., a null would occur so that no positive pulse would appear on line A and, hence, no positive pulse will be available on line $a$. In the absence of a positive input pulse, gate 181 would be open and a negative pulse would be derived at gate 181. This pulse, after inversion, would appear on line $\bar{a}$ as a positive pulse. In other words, line $\bar{a}$ would carry a positive pulse but line $a$ would carry no pulse. This is the same condition obtained when a binary zero appears on comparator output line A, as would be the case for an input frequency lying between 8 gc. and 9 gc. The binary code for 9 gc., therefore, will be the binary code having an initial zero, rather than a binary code having a one as the first digit.

The actual digit-to-analog converter of FIG. 4 includes four AND gates 201 to 204, each connected to a different group of lines $a$, $\bar{a}$, $b$ and $\bar{b}$, and a group of four AND gates 205 to 208, each connected to a different pair of lines $c$, $\bar{c}$, $d$ and $\bar{d}$. By using two groups of AND gates, a two-level decoder is obtained which is more economical than a single-level decoder having sixteen AND gates, each with four inputs. The AND gates 201 and 208 are constructed to pass a positive pulse when both inputs carry positive pulses. The positive pulses from a given one of gates 201 to 204 supply information concerning the first two digits of the binary code. The positive pulses from a given one of gates 205 to 208 supply information concerning the last two digits of the binary code. For any given input frequency, only one of gates 201 to 204 and only one of gates 205 to 208 is open. Lines 221 to 228 supply an output from respective gates 201 to 208 to a series of sixteen AND gates 231 to 246, each of which gates has two inputs. These AND gates 231 to 246 are characterized in that a positive pulse is derived whenever two positive input pulses reach a given gate. The particular output lines F1 to F16 from the respective gates 231 to 246 which carry an output pulse depend upon the binary code received; the latter, in turn, is dependent upon the frequency band within which the input signal lies.

By way of example, assume a frequency of 8.1 gc. The binary code for the frequency band of 8 gc. to 8.125 gc. is 0 0 0 0; in other words, all of the "not" lines $\bar{a}$, $\bar{b}$, $\bar{c}$ and $\bar{d}$ should carry a positive pulse and none of lines $a$, $b$, $c$ and $d$ carry a pulse. Gate 204 is connected to lines $\bar{a}$ and $\bar{b}$, while gate 208 is connected to lines $\bar{c}$ and $\bar{d}$. At a frequency of 8.1 gc., therefore, positive pulses will be available at both inputs to gates 204 and 208. These two gates then are open and positive pulses appear at the outputs thereof. These positive pulses are coupled by lines 224 and 228 to the gate 246 of the group of sixteen final AND gates. None of the other gates 201 to 204 and 205 to 208 will be open for this code position, so that gates 231 to 245 are closed. A positive pulse appears at the output of gate 246, that is, at output line F16.

Also, by way of example, if the input signal frequency is 9.6 gc., that is, a frequency lying within the band from 9.625 gc. to 9.75 gc., the binary code is 1 0 1 0 and, thus, is represented by positive pulses on lines $a$, $\bar{b}$, $c$ and $\bar{d}$. Gates 203 and 207 then receive positive pulses at both inputs and thereby are open. Positive pulses from these two gates appear on lines 223 and 227. These pulses are supplied to gate 234, causing a positive pulse to appear at its output, that is, on line F4.

The azimuth sensing system is shown in detail in FIGS. 5 and 6 and includes a plurality of antenna elements 21 to 30 arranged in pairs to form a binary array. The two antennas of a given pair are connected to a corresponding pair of hybrid networks 261a and 262a, 261b and 262b, 261c and 262c, 261d and 262d, and 261e and 262e. Each of these pairs of hybrids combine to provide two output voltages which depend in magnitude upon the relative phase of excitation of the corresponding antennas. The output voltages at each pair of hybrids are coupled to a corresponding one of voltage comparators 271 to 275 which may be similar in construction and operation to the voltage comparators 161 to 164 used in the frequency sensing circuitry of FIGS. 3 and 4. Each given pair of hybrids, in combination with their associated voltage comparator circuit, provides a group of phase comparator circuits 31 to 35. As previously mentioned, if an incoming signal of frequency $f$ arrives at a given pair of antennas from a direction other than normal to the line connecting these antennas, the two antennas will be excited in different phase and the phase angle $\varphi$ in radians is given by $$\varphi = \frac{2\pi d \sin \theta}{\lambda}$$

where $\varphi$ is the phase angle, $d$ is the distance between antennas, $\theta$ is the bearing angle, and $\lambda$ is the wavelength at frequency $f$. The spacing between antenna elements 21 and 22 of the closest spaced array is made slightly less than one-half wavelength at the highest operating frequency, while the spacing of each additional pair of antennas will be exactly twice that of the preceding pair.

For purposes of explanation, it will be assumed that the spacing $d_1$ of antennas 21 and 22 is 0.5 inch or 1.270 cm., that the spacing $d_2$ of antennas 23 and 24 is 2.54 cm., that the spacing $d_3$ of antennas 25 and 26 is 5.08 cm., that the spacing $d_4$ of antennas 27 and 28 is 10.16 cm., and that the spacing $d_5$ of antennas 29 and 30 is 20.3 cm.

The antennas 21 and 22 are connected by means of transmission lines 250a and 251a of equal length to the collinear input arms 252a and 253a of series T junction 261a and also by means of transmission lines 255a and 256a of equal length to the collinear input arms 257a and 258a of shunt T junction 262a. The output or E-arm 254a of the series T junction and the output or H-arm 259a of the shunt T junction are connected by respective lines 260a and 261a to voltage comparator circuit 271. As in the case of the frequency sensing circuits of FIGS. 3 and 4, diodes 262a and 263a are mounted in the respective output arms 254a and 259a of T junctions 261a and 262a. Because of space limitations, and since these diodes serve also as rectifying diodes for voltage comparator 271, they have been indicated schematically as component parts of the voltage comparator 271. This voltage comparator, also includes resistors 264a and 265a which, in combination with capacitors 266a and 267a, provide the long time constant circuit for pulse shaping (such as described previously in connection with the voltage comparators 161 to 164 of FIG. 3), and a common resistor 268a across which an output voltage is derived. This output voltage then appears on comparator output line AA.

The properties of the series T junction 261a are such that, if equal energy enters input arms 261a and 252a in phase opposition, substantially all of this energy appears at the output or E-arm 254a and the voltage sensed by diode 262a is a maximum. As the energy applied to the two input arms departs from this relation of phase opposition, the energy available in E-arm 254a decreases until, at a condition of input energies of like phase, the output from the E-arm is substantially zero. The shunt T junction 262a is such that a maximum output is derived from the output or H-arm 259a when the energy supplied to one input arm is in phase with energy supplied to the other input arm. When the energy supplied to these two arms is in phase opposition, the output from H-arm 259a is substantially zero. When the phase angle $\varphi$ is zero, that is, when energy supplied to the input arms of both T junctions 261a and 262a is in phase, the output from E-arm 254a is zero, while the output from H-arm 259a is a maximum. Consequently, the voltage at line 260a is zero and the voltage at line 261a is a maximum. Diode 263a alone is conducting and electron flow is from the anode of diode 263a through the grounded walls of hybrid 262a, from left to right in common resistor 268a, through resistor 265a and back to the cathode of diode 263a. A positive pulse representing a binary zero then appears at comparator output line AA. When $\pi$ reaches a value of $\varphi/2$ radians, the outputs of E and H arms 254a and 259a are of equal magnitude. Current flow in both diodes 262a and 263a then is equal but opposite in direction so that the resultant current flow in common resistor 268a, and, consequently, the output voltage at output line AA, is a null. As the phase angle $\varphi$ further increases, the energy from E-arm 254a predominates over that available at H-arm 259a. Finally, at $\varphi=280°$, all the output energy appears at E-arm 254. The diode 262a alone is conducting and electron flow is along the path including diode 262a, from right to left in common resistor 268a, and thence to ground. In this case, a negative voltage pulse is produced across resistor 268a of voltage comparator 271 and this negative pulse, representing a binary one, is available at comparator output line AA.

Considering the case of the first pair of antennas spaced apart a distance $d_1$, $d_1$ is equal to 1.27 cm., and $\lambda$ at a frequency of 10 gc. is 3.0 cm. The bearing angle $\theta_1$ then is given by $$\theta_1 = \frac{\varphi(3.0)}{2\pi(1.27)} = \text{arc sin } 1.181\frac{\varphi}{\pi}$$

At a bearing angle=0°, the output from H-arm 259a is a maximum and a binary zero is derived at line AA. At a bearing angle at which the sine is 1.181×.5=0.590, a null is obtained, since the phase angle equals 90°. This bearing angle is 36.2°. The equation indicates that the output of the E-arm 254a would be a maximum for an angle whose sine, E, is 1.181. Such an angle, of course, is physically impossible. From the above, it is evident that a binary zero is obtained, for a frequency of 10 gc., for bearing angles from zero degrees to the crossover point of 36.2°. Above 36.2° and up to 90°, the energy in E-arm 254 predominates and a binary one is obtained. The quadrant in which the target lies may be determined by circuitry to be described subsequently.

The antennas 23 and 24 are connected by way of transmission lines 250b and 251b to the input arms of series T junction 261b and by means of transmission lines 255b and 256b to the input arms of shunt T junction 262b. The hybrids 261b and 262b are represented schematically in FIG. 5 in order to conserve space, since they are identical to the respective hybrids 261a and 262a. In fact, all components of the phase comparators 32 to 35 corresponding to those of phase comparator 31, including the components of voltage comparators 272 to 275, are indicated by like reference numerals but with a different accompanying letter. As in the case of phase comparator 31, the series T junction 261b provides a minimum voltage at E-arm 254b and the shunt T junction 262b provides a maximum voltage at H-arm 259b when $\varphi=0, 2\pi, 4\pi$ ... radians. When $\varphi=\pi, 3\pi, 5\pi$ ... radians, the voltage at E-arm 254b is a maximum and the voltage at H-arm 259b is a minimum. For $\varphi=\pi/2, 3\pi/2, 5\pi/2$ ... radians, the voltage in E-arm 254b is equal to the voltage in H-arm 259b. Consequently, a binary zero is obtained at output line BB of comparator 272 when $\varphi=0, 2\pi, 4\pi$ ... radians, a binary one is obtained when $\varphi=\pi, 3\pi, 5\pi$ ... radians, and a null is obtained when $\varphi=\pi/2, 3\pi/2, 5\pi/2$ ... radians. Since $d_2=2.54$ cm. and $\lambda=3.0$ cm. at 10 gc., the bearing angle $\theta_2$ for the antenna pair 22, 23 becomes $$\theta_2 = \arcsin \frac{\varphi(3.0)}{2\pi(2.54)} = \arcsin .5905\frac{\varphi}{\pi}$$

From this equation it is evident that when $\varphi/\pi$ is 0, 2, 4 ... a binary zero is obtained on output line BB, when $\varphi/\pi$ is 1, 3, 5 ... a binary one is obtained at output line BB, and when $\varphi/\pi$ is ½, ⅜, 5/2 ... a null is obtained at the output of comparator 272. The bearing angle $\theta_2$ whose sine is .5905(0) is zero degrees, while the bearing angle $\theta_2$ whose sine is .5905(2) and .5905(4) ... are meaningless. The bearing angle $\theta_2$ whose sine is .5905(1)=.5905 is 36.2°. Bearing angle $\theta_2$ whose sine is .5905(3), .5905(5) ... are meaningless. The bearing angle $\theta_2$ whose sine is .5905(½)=.295 is 17.2°, whereas the angle $\theta_2$ whose sine is .5905(⅜)=.8857 is 62.3°. It is now evident that a binary zero will be obtained for bearing angles $\theta_2$ from 0 to 17.2°, a null or crossover will occur at 17.2°, a binary one will occur for bearing angles $\theta_2$ from 17.2° to 62.3°, a further null will occur at 62.3° and a binary zero will again occur for bearing angles $\theta_2$ from 62.3° to 90°.

The antennas 25 and 26 are connected by transmission lines 250c and 251c to the input arms of series T junction 261c and by transmission lines 255c and 256c to input arms of shunt T junction 262c. As in the previous phase comparators 31 and 32, a binary zero is obtained at output line CC when $\varphi=0, 2\pi, 4\pi$ ... radians, a binary one when $\varphi=\pi, 3\pi, 5\pi$ ... radians, and a null when $\varphi=\pi/2, 3\pi/2, 5\pi/2$ ... radians. Since $d_3=5.08$ cm. and $\lambda=3.0$ cm. at 10 gc., the equation for $\theta_3$ becomes $$\theta_3 = \arcsin \frac{\varphi(3.0)}{2\pi(5.08)} = \arcsin .295\frac{\varphi}{\pi}$$

Table IV indicates the code derived for various bearing angles $\theta_3$ at phase comparator 33.

*Table IV*

| $\varphi$ | Relationship of H and E Arm Outputs | Output of Comparator 33 | $\varphi/\pi$ | $\theta_3$ | |
|---|---|---|---|---|---|
| 0° | H>E | 0 | 0 | Sin⁻¹ .2952(0) | 0° |
| 90° ($\pi/2$) | H=E | Null | 0.5 | Sin⁻¹ .2952(0.5) | 8.5° |
| 180° ($\pi$) | E>H | 1 | 1 | Sin⁻¹ .2952 | 17.2° |
| 270° ($3\pi/2$) | H=E | Null | 1.5 | Sin⁻¹ .4428 | 26.4° |
| 360° ($2\pi$) | H>E | 0 | 2 | Sin⁻¹ .5905 | 36.2° |
| 450° ($5\pi/2$) | H=E | Null | 2.5 | Sin⁻¹ .7380 | 47.6° |
| 540° ($3\pi$) | E>H | 1 | 3 | Sin⁻¹ .8857 | 62.3° |
| 630° ($7\pi/2$) | H=E | Null | 3.5 | Sin⁻¹ >1 | ----- |

The antennas 27 and 28, spaced apart 10.16 cm., are connected to collinear input arms 252d and 253d of series T junction 261d and to the input arms 257d and 258d of shunt T junction 262d. In the case of phase comparator 34, $$\theta_4 = \arcsin \frac{\varphi(3.0)}{2\pi(10.16)} = \arcsin .1476\frac{\varphi}{\pi}$$

and Table V indicates the code digits attained for various bearing angles at the phase comparator 34.

*Table V*

| $\varphi$ | Relationship of H and E Arm Outputs | Output of Comparator 34 | $\varphi/\pi$ | $\theta_4$ | |
|---|---|---|---|---|---|
| 0° | H>E | 0 | 0 | Sin⁻¹ .1476(0) | 0° |
| 90° ($\pi/2$) | H=E | Null | .5 | Sin⁻¹ .0738 | 4.2° |
| 180° ($\pi$) | E>H | 1 | 1 | Sin⁻¹ .1476(1) | 8.5° |
| 270° ($3\pi/2$) | H=E | Null | 1.5 | Sin⁻¹ .2214 | 12.8° |
| 360° ($2\pi$) | H>E | 0 | 2 | Sin⁻¹ .2952 | 17.2° |
| 450° ($5\pi/2$) | H=E | Null | 2.5 | Sin⁻¹ .3690 | 21.7° |
| 540° ($3\pi$) | E>H | 1 | 3 | Sin⁻¹ .4428 | 26.4° |
| 630° ($7\pi/2$) | H=E | Null | 3.5 | Sin⁻¹ .5166 | 31.1° |
| 720° ($4\pi$) | H>E | 0 | 4 | Sin⁻¹ .5905 | 36.2° |
| 810° ($9\pi/2$) | H=E | Null | 4.5 | Sin⁻¹ .6643 | 41.6° |
| 900° ($5\pi$) | E>H | 1 | 5 | Sin⁻¹ .7380 | 47.6° |
| 990° ($11\pi/2$) | H=E | Null | 5.5 | Sin⁻¹ .8118 | 54.3° |
| 1080° ($6\pi$) | H>E | 0 | 6 | Sin⁻¹ .8856 | 62.3° |
| 1170° ($13\pi/2$) | H=E | Null | 6.5 | Sin⁻¹ .9594 | 73.6° |
| 1260° ($7\pi$) | E>H | 1 | 7 | Sin⁻¹ >1 | ----- |

The antennas 29 and 30, spaced apart 20.3 cm., are connected to the input arms 252e and 253e of series T junction 261e and to the input arms 257e and 258e of shunt T junction 262e. For this phase comparator 35, the equation for bearing angle becomes $$\theta_5 = \arcsin \frac{3\varphi}{2\pi(20.3)} = \arcsin .0738\frac{\varphi}{\pi}$$

and Table VI indicates the code derived for various bearing angles.

*Table VI*

| $\varphi$ | Output of Comparator 35 | $\varphi/\pi$ | $\theta_5$ | |
|---|---|---|---|---|
| 0 | 0 | 0 | Sin⁻¹ .0738(0) | 0° |
| $\pi$ | Null | .5 | Sin⁻¹ .0738(.5) | 2.1° |
| $\pi/2$ | 1 | 1 | Sin⁻¹ .0738 | 4.2° |
| $\pi$ | Null | 1.5 | Sin⁻¹ .1107 | 6.4° |
| $3/2\pi$ | 0 | 2 | Sin⁻¹ .1476 | 8.5° |
| $2\pi$ | Null | 2.5 | Sin⁻¹ .1845 | 10.5° |
| $5/2\pi$ | 1 | 3 | Sin⁻¹ .2214 | 12.8° |
| $3\pi$ | Null | 3.5 | Sin⁻¹ .2583 | 15.0° |
| $7/2\pi$ | 0 | 4 | Sin⁻¹ .2952 | 17.2° |
| $4\pi$ | Null | 4.5 | Sin⁻¹ .3321 | 19.4° |
| $9/2\pi$ | 1 | 5 | Sin⁻¹ .3690 | 21.7° |
| $5\pi$ | Null | 5.5 | Sin⁻¹ .4059 | 24.0° |
| $11/2\pi$ | 0 | 6 | Sin⁻¹ .4428 | 26.4° |
| $6\pi$ | Null | 6.5 | Sin⁻¹ .4797 | 28.7° |
| $13/2\pi$ | 1 | 7 | Sin⁻¹ .5166 | 31.1° |
| $7\pi$ | Null | 7.5 | Sin⁻¹ .5535 | 33.6° |
| $15/2\pi$ | 0 | 8 | Sin⁻¹ .5905 | 36.2° |
| $8\pi$ | Null | 8.5 | Sin⁻¹ .627 | 38.8° |
| $17/2\pi$ | 1 | 9 | Sin⁻¹ .6643 | 41.6° |
| $9\pi$ | Null | 9.5 | Sin⁻¹ .7012 | 44.5° |
| $19/2\pi$ | 0 | 10 | Sin⁻¹ .7380 | 47.6° |
| $10\pi$ | Null | 10.5 | Sin⁻¹ .7749 | 50.8° |
| $21/2\pi$ | 1 | 11 | Sin⁻¹ .8118 | 54.3° |
| $11\pi$ | Null | 11.5 | Sin⁻¹ .8487 | 58.2° |
| $23/2\pi$ | 0 | 12 | Sin⁻¹ .8857 | 62.3° |
| $12\pi$ | Null | 12.5 | Sin⁻¹ .9225 | 67.3° |
| $25/2\pi$ | 1 | 13 | Sin⁻¹ .9594 | 73.6° |
| $13\pi$ | Null | 13.5 | Sin⁻¹ .9963 | 85.1° |
| $27/2\pi$ | 0 | 14 | Sin⁻¹ >1 | ----- |
| $14\pi$ | | | | |

The relationship of the crossover points at 10 gc. for the five phase comparator output lines is shown in FIG. 7a and also in tabular form in Table VII. It is evident that there are actually twenty-eight different code combinations possible, one for each azimuth band. For example, for an azimuth band from 0° to 2.1°, the code at 10 gc. is 0 0 0 0 0 and for bearing angles from 2.1° to 4.2° the code at this frequency is 0 0 0 0 1, etc.

Table VII

| Azimuth Band No. | Bearing Angle Range | Line AA | Line BB | Line CC | Line DD | Line EE |
|---|---|---|---|---|---|---|
| 1 | 0-2.1° | 0 | 0 | 0 | 0 | 0 |
| 2 | 2.1-4.2° | 0 | 0 | 0 | 0 | 1 |
| 3 | 4.2-6.4° | 0 | 0 | 0 | 1 | 1 |
| 4 | 6.4-8.5° | 0 | 0 | 0 | 1 | 0 |
| 5 | 8.5-10.5° | 0 | 0 | 1 | 1 | 0 |
| 6 | 10.5-12.8° | 0 | 0 | 1 | 1 | 1 |
| 7 | 12.8-15.0° | 0 | 0 | 1 | 0 | 1 |
| 8 | 15.0-17.2° | 0 | 0 | 1 | 0 | 0 |
| 9 | 17.2-19.4° | 0 | 1 | 1 | 0 | 0 |
| 10 | 19.4-21.7° | 0 | 1 | 1 | 0 | 1 |
| 11 | 21.7-24.0° | 0 | 1 | 1 | 1 | 1 |
| 12 | 24.0-26.4° | 0 | 1 | 1 | 1 | 0 |
| 13 | 26.4-28.7° | 0 | 1 | 0 | 1 | 0 |
| 14 | 28.7-31.1° | 0 | 1 | 0 | 1 | 1 |
| 15 | 31.1-33.6° | 0 | 1 | 0 | 0 | 1 |
| 16 | 33.6-36.2° | 0 | 1 | 0 | 0 | 0 |
| 17 | 36.2-38.8° | 1 | 1 | 0 | 0 | 0 |
| 18 | 38.8-41.6° | 1 | 1 | 0 | 0 | 1 |
| 19 | 41.6-44.5° | 1 | 1 | 0 | 1 | 1 |
| 20 | 44.5-47.6° | 1 | 1 | 0 | 1 | 0 |
| 21 | 47.6-50.8° | 1 | 1 | 1 | 1 | 0 |
| 22 | 50.8-54.3° | 1 | 1 | 1 | 1 | 1 |
| 23 | 54.3-58.2° | 1 | 1 | 1 | 0 | 1 |
| 24 | 58.2-62.3° | 1 | 1 | 1 | 0 | 0 |
| 25 | 62.3-67.3° | 1 | 0 | 1 | 0 | 0 |
| 26 | 67.3-73.6° | 1 | 0 | 1 | 0 | 1 |
| 27 | 73.6-85.1° | 1 | 0 | 1 | 1 | 1 |
| 28 | 85.1-90° | 1 | 0 | 1 | 1 | 0 |

If the frequency of the incoming signal were 9.875 gc., instead of 10 gc., the equation for the first phase comparison circuit 31 becomes $$\theta_1 = \arcsin \frac{\varphi(3.038)}{2\pi(1.270)} = \arcsin 1.196 \frac{\varphi}{\pi}$$

Crossover points for the first phase comparison circuit 31 then appear at a bearing angle at which $\varphi = \pi/2$ or at an angle whose sine = 1.196(.5) = 0.598. This angle is 36.7°.

The equation for the second phase comparison circuit 32 at 9.875 gc. becomes $$\theta_2 = \arcsin \frac{\varphi(3.038)}{2\pi(2.54)} = \arcsin 0.598 \frac{\varphi}{\pi}$$

Crossover points for the second phase comparison circuit 32 then appear at a bearing angle at which $\varphi = \pi/2$ and $3\pi/2$ or at angles whose sines are .598(.5) = .299 and 0.598(1.5) = .896; i.e., at bearing angles 17.4° and 63.6°.

The equation for the third phase comparison circuit 33 at 9.875 gc. becomes $$\theta_3 = \arcsin \frac{\varphi(3.038)}{2\pi(5.08)} = \arcsin 0.299 \frac{\varphi}{\pi}$$

Crossover points for the third phase comparison circuit 33 then appear at a bearing angle at which $\varphi = \pi/2$, $3\pi/2$ and $5\pi/2$ or at angles whose sines are 0.299(.5) = 0.1494, 0.299(1.5) = 0.448, and 0.299(2.5) = 0.747; viz., at bearing angles 8.6°, 26.6° and 48.3°.

The equation for the fourth phase comparison circuit 34 at 9.875 gc. becomes $$\theta_4 = \arcsin \frac{\varphi(3.038)}{2\pi(10.16)} = \arcsin 0.1494 \frac{\varphi}{\pi}$$

Crossover points for the fourth phase comparison circuit 34 then appear at bearing angles at which $\varphi = \pi/2$, $3\pi/2$, $5\pi/2$, $7\pi/2$, $9\pi/2$, $11\pi/2$ and $13\pi/2$, or at angles where sines are 0.1494(.5) = 0.0747, 0.1494(1.5) = 0.224,
0.1494(2.5) = 0.373, 0.1494(3.5) = 0.523,
0.1494(4.5) = 0.672, and 0.1494(5.5) = 0.822, and 0.1494(6.5) = 0.971; viz., at bearing angles 4.3°, 12.9°, 21.9°, 31.5°, 42.2°, 55.3° and 76.2°.

The equation for the fifth phase comparison circuit 35 at 9.875 gc. becomes $$\theta_5 = \arcsin \frac{\varphi(3.038)}{2\pi(20.3)} = \arcsin 0.0747 \frac{\varphi}{\pi}$$

Crossover points for the fifth phase comparison circuit 35 then appear at bearing angles at which $\varphi = \pi/2$, $3\pi/2$, $5\pi/2$ ... $25\pi/2$. These are angles whose sines are .0373, .1120, .1867, .261, .336, .411, .486, .560, .635, .710, .784, .859 and .933. The bearing angles corresponding to a null output at comparator output line EE then are 2.1°, 6.4°, 10.8°, 15.1°, 19.6°, 24.2°, 29.0°, 34.1°, 39.4°, 45.2°, 51.6°, 59.2° and 68.9°. The binary code at comparator output lines AA to EE at 9.875 gc. now can be determined and is represented in FIG. 7b and by the table VIII, which follows.

Table VIII

| Azimuth Band No. | Bearing Angle Range | Line AA | Line BB | Line CC | Line DD | Line EE |
|---|---|---|---|---|---|---|
| 1 | 0-2.1° | 0 | 0 | 0 | 0 | 0 |
| 2 | 2.1-4.3° | 0 | 0 | 0 | 0 | 1 |
| 3 | 4.3-6.4° | 0 | 0 | 0 | 1 | 1 |
| 4 | 6.4-8.6° | 0 | 0 | 0 | 1 | 0 |
| 5 | 8.6-10.8° | 0 | 0 | 1 | 1 | 0 |
| 6 | 10.8-12.9° | 0 | 0 | 1 | 1 | 1 |
| 7 | 12.9-15.1° | 0 | 0 | 1 | 0 | 1 |
| 8 | 15.1-17.4° | 0 | 0 | 1 | 0 | 0 |
| 9 | 17.4-19.6° | 0 | 1 | 1 | 0 | 0 |
| 10 | 19.6-21.9° | 0 | 1 | 1 | 0 | 1 |
| 11 | 21.9-24.2° | 0 | 1 | 1 | 1 | 1 |
| 12 | 24.2-26.6° | 0 | 1 | 1 | 1 | 0 |
| 13 | 26.6-29.0° | 0 | 1 | 0 | 1 | 0 |
| 14 | 29.0-31.5° | 0 | 1 | 0 | 1 | 1 |
| 15 | 31.5-34.1° | 0 | 1 | 0 | 0 | 1 |
| 16 | 34.1-36.7° | 0 | 1 | 0 | 0 | 0 |
| 17 | 36.7-39.4° | 1 | 1 | 0 | 0 | 0 |
| 18 | 39.4-42.2° | 1 | 1 | 0 | 0 | 1 |
| 19 | 42.2-45.2° | 1 | 1 | 0 | 1 | 1 |
| 20 | 45.2-48.3° | 1 | 1 | 0 | 1 | 0 |
| 21 | 48.3-51.6° | 1 | 1 | 1 | 1 | 0 |
| 22 | 51.6-55.3° | 1 | 1 | 1 | 1 | 1 |
| 23 | 55.3-59.2° | 1 | 1 | 1 | 0 | 1 |
| 24 | 59.2-63.6° | 1 | 1 | 1 | 0 | 0 |
| 25 | 63.6-68.9° | 1 | 0 | 1 | 0 | 0 |
| 26 | 68.9-76.2° | 1 | 0 | 1 | 0 | 1 |
| 27 | 76.2-90° | 1 | 0 | 1 | 1 | 1 |

A glance at both FIG. 7b and Table VIII will indicate that there are but twenty-seven azimuth bands for a frequency of 9.875 gc. For $\varphi = 27/2\pi$, $\theta_5$ at 10 gc. = arc sin .0738(13.5) = arc sin .996 = 85.1°. However, for $\varphi = 27/2\pi$ at 9.875 gc., $\theta_5$ = arc sin .0747(13.5) = arc sin 1.008. Since the sine of an angle cannot exceed unity, this situation is impossible in practice. Consequently, there are but thirteen crossover points for phase comparator 35 at 9.875 gc., as compared with the fourteen crossover points at 10 gc. At still lower frequencies, the number of crossovers for the various phase comparison circuits 32 to 35 become gradually less, until, at 8 gc., there are but five crossovers for phase comparison circuit 34 and only eleven crossovers for phase comparison circuit 35.

The situation at a frequency of 8 gc. will be analyzed as a final example. At 8 gc., $\lambda = 3.75$ cm. and $$\theta_1 = \arcsin \frac{3.75\varphi}{2\pi(1.270)} = \arcsin 1.476 \frac{\varphi}{\pi}$$

When $\varphi = \pi/2$ radians, i.e., when $\pi/\varphi = 0.5$, $\theta_1$ is equal to the angle whose sine is 0.5, or 47.6°. This is the only crossover for phase comparison circuit 31 at 8 gc. Between zero and 47.6° the output at H-arm 259a exceeds that at E-arm 254a and a binary zero is obtained. Between 47.6° and 90°, the output at E-arm 254a is greater than that at H-arm 259a and a binary one is obtained. At 8 gc., $$\theta_2 = \arcsin \frac{3.75\varphi}{2\pi(2.54)} = \arcsin 0.738 \frac{\varphi}{\pi}$$

At $\pi/2$ radians, $\theta_2 = 21.6°$. This is the only crossover for phase comparison circuit 32 at 8 gc. and is the point at which the binary digit changes from a zero to a one. At $\pi$ radians, $\theta_2 = \arcsin .738(1) = 47.6°$. At this bearing angle, the output at E-arm 254b is a maximum and the output at H-arm 258 is a minimum. For bearing angles from 21.6° to 90°, a binary one is obtained.

At 8 gc., $\theta_3$ is given by $\theta_3 = \arcsin 0.369\, \varphi/\pi$. Crossovers are obtained when $\varphi = \pi/2$, $3/2\pi$ and $5/2\pi$, that is, for bearing angles of 10.6°, 33.6° and 67.3°.

At 8 gc., $\theta_4$ is given by $\theta_4 = \arcsin 0.1845\, \varphi/\pi$. Crossovers are obtained for phase comparison circuit 34 when $\varphi = \pi/2$, $3/2\pi$, $5/2\pi$, $7/2\pi$ and $9/2\pi$, viz., for bearing angles $\theta_4$ where sine is 0.092, 0.276, 0.461, 0.646 and 0.830. These bearing angles are 5.3°, 16.0°, 27.5°, 40.2° and 56.1°.

Crossovers are obtained for the phase comparison circuit 35 when $\varphi/\pi = 1$, 1.5, 2.5, 3.5, 4.5, 5.5, 6.5, 7.5, 8.5, 9.5 and 10.5. Since, at 8 gc., $\theta_5 = \arcsin 0.09225\, \varphi/\pi$, the crossovers for phase comparison circuit 35 occur for bearing angles $\theta_5$ where sine is 0.0461, 0.1384, 0.2305, 0.323, 0.415, 0.507, 0.599, 0.691, 0.784, 0.876 and 0.969. These bearing angles are 2.6°, 7.9°, 13.3°, 18.8°, 24.5°, 30.5°, 36.8°, 43.7°, 51.6°, 61.2° and 75.6°.

From FIG. 7c, it is evident that still another code is derived at the outputs of comparator lines AA to EE for a frequency of 8 gc. The various codes for other frequencies between 8 gc. and 9.875 gc. can be obtained in the manner already described and curves indicating the relationship between frequency and bearing angle may be obtained as shown in FIG. 8. It will be noted that there are twenty-eight azimuth regions or bands which vary considerably over the frequency and azimuth operating range of the equipment. Each azimuth band is characterized by the same binary code at output lines AA to EE. As shown by way of example in FIG. 8, azimuth band No. 1 includes values of true bearing angle $\theta$ ranging from 0° to 2.1° at 10 gc., from 0° to 2.3° at 9 gc., and from 0° to 2.6° at 8 gc. Similarly, azimuth band No. 20, for example, includes values of $\theta$ ranging from 44.5° to 47.6° at 10 gc., from 51.2° to 55.1° at 9 gc., and from 61.2° to 67.3° at 8 gc., etc.

The binary code obtained at the output lines AA to EE of the phase comparison circuits 31 to 35 is converted into analog information by means of the circuitry of FIGS. 5 and 6 which is similar in operation to that described in FIGS. 3 and 4 for converting a binary code on output lines A to D into output pulses on one of the frequency lines F1 to F16. For example, assume that a binary code 0 1 0 1 0 (azimuth band No. 13) is derived at some combination of frequency and bearing angle, such as a frequency of 9 gc. and bearing angle of 30°. Then there will be binary zeros (positive pulses) on lines AA, CC and EE and binary ones (negative pulses) on lines BB and DD of the circuitry of FIG. 4. These pulses will be amplified and stretched in the corresponding amplifier-pulse stretchers 281 to 285. The amplified pulses are applied to inverter-amplifier stages 286 to 290 which amplify only negative pulses and provide positive pulses on respective lines $aa$, $bb$, $cc$, $dd$ and $ee$, whenever a negative pulse is present at the corresponding one of output lines AA to EE. Inverter-amplifier stages 286 to 290 do not respond to a positive pulse so that no pulses appear on lines $aa \ldots ee$ for a binary zero. The amplifier 291 operates only on a positive pulse and will amplify only a binary zero. At least one of the three lines 293 to 295 will supply a positive pulse from respective amplifiers 291, 286 and 287 to OR gate 298, regardless of the binary code available at output lines AA ... EE. This positive pulse from OR gate 298, after inversion to a negative pulse in inverter 299, serves as one input to a group of negative AND gates 301 to 305; these AND gates also are connected to respective lines $aa \ldots ee$ and are inhibited during the presence of a positive pulse from lines $aa \ldots ee$ so that no pulses can exist on output lines $\overline{aa}$, $\overline{bb}$, $\overline{cc}$, $\overline{dd}$, $\overline{ee}$. If either a null or a binary zero appears on a given phase comparator output line, the corresponding one of gates 301 to 305 are open and a negative pulse is derived at the output thereof; this output, after inversion, appears as positive pulses on the corresponding one of lines $\overline{aa}$, $\overline{bb}$, $\overline{cc}$, $\overline{dd}$ and $\overline{ee}$. For the binary code 0 1 0 1 0, therefore, no pulses appear on lines $aa$, $cc$, $ee$, while positive pulses appear on lines $bb$ and $dd$. The positive pulses from amplifier 291 and from inverter-amplifier 287 are supplied by way of lines 293 and 295 to OR gate 298. In addition to the negative pulses on AND gates 301 to 305 from inverter 299, AND gates 301, 303 and 305 are uninhibited owing to the absence of inhibited positive pulses on lines $aa$, $cc$ and $ee$. Consequently, gates 301, 303 and 305 are open and positive pulses from associated inverters 306, 308 and 310 appear on lines $\overline{aa}$, $\overline{cc}$ and $\overline{ee}$. No pulses pass the AND gates 302 and 304, however, since these gates are inhibited by positive pulses on lines $bb$ and $dd$. A group of AND gates 311 to 317 have inputs connected to a different combination of the three lines $aa$, $\overline{aa}$, $bb$, $\overline{bb}$, $cc$ and $\overline{cc}$, while a group of four AND gates 318 to 321 are connected to a different pair of lines $dd$, $\overline{dd}$, $ee$ and $\overline{ee}$. Each of the AND gates 311 to 321 are adapted to provide a positive output pulse when all inputs thereto carry positive pulses. For the binary code 0 1 0 1 0, the AND gates 314 and 319 are open and positive pulses appear on lines 334 and 338. Lines 331 to 341 supply outputs, if any, from corresponding gates 311 to 321 to a series of twenty-eight output AND gates 351 to 378, each having two inputs and each characterized in that a positive output pulse is derived on a corresponding one of output lines A1 to A28 whenever two positive input pulses reach that gate. In the example given, output AND gate 363 is the only one of the output gates receptive of pulses at both inputs, so that a positive output pulse is derived at output line A13 for the binary code 0 1 0 1 0. None of the other gates 311 to 313, 315 to 318, 320 and 321 are open for this code position, so that the output gates 351 to 362 and 364 to 378 are disabled.

It is now evident that an output will be obtained on one only of the azimuth band lines A1 to A28; the energized output line will be determined by the bearing angle or true azimuth of the target relative to the equipment, as well as by the frequency of the signal emanating from the target.

Since the bearing angle corresponding to a particular binary number for code combination varies as a function of frequency, it is necessary now to correlate the decoded azimuth band with respect to frequency in order to indicate true azimuth. The azimuth-frequency correlation matrix 50 of FIG. 1 necessary for this purpose will now be described. To illustrate the operation of the correlation matrix, consider the curves of FIG. 8. For azimuth band No. 1, a binary code 0 0 0 0 0 is obtained and azimuth band output line A1 is energized. Furthermore, all frequency bands 1 to 16 are represented within the region bounded by the X-axis on the first curve. Consequently, any one of frequency output lines F1 to F16 may carry an output when the azimuth band output line A1 is energized. For azimuth band No. 28, where a binary code 1 0 1 1 0 attains, only one frequency band, namely, frequency band No. 1, is involved. Consequently, frequency output line F1 only can carry an output pulse when azimuth band output line A28 is energized. By selecting a plurality of true azimuth belts and choosing the tolerance desired for each such belt, one may readily establish the necessary logic circuitry for the correlation matrix 50.

Consider a true azimuth of 2.5°. From the curves of FIG. 8, it is apparent that this bearing may exist with any of the following combinations: (1) azimuth band No. 1 and any of the frequencies from 8 to 10 gc.; and (2) azimuth band No. 2 and frequencies ranging from 8.5 gc. to 10 gc. The various input frequency bands corresponding to a given azimuth band are combined in an OR gate; one such OR gate will be provided for each group of frequency bands associated with an azimuth band. The output of each such frequency OR gate will be supplied to an AND gate, together with the azimuth band output associated with the frequency band(s) being combined in the frequency OR gate. The outputs of the various AND gates then are supplied to a final OR gate. Each of the aforesaid AND and OR gates are responsive to positive pulses and provide a positive pulse output, under appropriate input conditions. The output of this final OR gate is the output line for each true azimuth to be indicated.

In the above example of 2.5°, the frequency output lines F1 to F16 could be combined in a first frequency OR gate and the output thereof supplied to a first AND gate which also is connected to azimuth band output line A1. Furthermore, the frequency output lines F1 to F12 could be combined in another OR gate and the output therefrom applied to a second AND gate supplied also from the azimuth band output line A2. The outputs from these two AND gates would then be combined in a final OR gate. It is obvious from the particular example given, however, that the output from azimuth band line A1 could be applied directly to the final OR gate since all frequencies within the range of operation of the equipment may be associated with azimuth band No. 1. The simplified correlation circuitry for 2.5°, then, consists, as shown in FIG. 9, of the first OR gate 461 whose input is connected to frequency lines F1 to F12. The outputs of OR gate 461, along with azimuth band line A2, serve as inputs to AND gate 463. The output of the latter gate and the azimuth band line A1 are connected to an OR gate 465; the output of the latter gate then is connected to the 2.5° true azimuth terminal. Any positive pulses appearing at the 2.5° terminal may be supplied to any one of several types of indicating devices, such as a grid glow tube 52a. It will be noted that the curve adjacent the X-axis intersects the 2.5° coordinate at 8.5 gc. (the boundary of frequency bands 12 and 13). At this frequency boundary, azimuth band No. 2 extends to a value of 5.0° (the intersection of the second curve from the X-axis from 8.5 gc.). Because of this upper limiting value, the resolution for the first true azimuth is considered to be 2.5°±2.5°. The true azimuth region 2.5°±2.5° is referred to as a true azimuth belt.

Consider a true azimuth of 5°. From the curves of FIG. 8, it is evident that azimuth bands Nos. 2 and 3 are involved. At a true bearing of 5°, the second curve from the X-axis intersects the 5° coordinate at 8.5 gc. Associated with azimuth band No. 2, therefore, are frequency bands 13 to 16, while frequency bands 1 to 12 are associated with azimuth band No. 3. At the aforesaid boundary of frequency bands 12 and 13 (8.5 gc.), the curve separating azimuth bands 3 and 4 intersects 8.5 gc. at 7.5°. An upper limit of 2.5° was therefore set for the true bearing of 5° so that the true bearing belt is 5.0°±2.5°. The correlation circuitry for 5° is shown in FIG. 9 and includes a first OR gate 471 connected to frequency lines F13 to F16. The output of this OR gate, together with azimuth band line A2, is connected to a first AND gate 473. Similarly, the output frequency lines F1 to F12 are supplied to second OR gate 475; the output of this gate, together with azimuth band line A3, is connected to AND gate 477. The outputs of AND gates 473 and 477 are combined in a final OR gate 479 whose output is connected to the 5° true azimuth terminal. An indicating device may be connected to this terminal and may be energized when positive pulses appear at the output of AND gate 479. The circuitry which permits quadrant identification is explained subsequently and includes quadrant logic circuit 49 and indicating devices 52b to 52e.

Consider now a true azimuth of 25°. At 25°, frequency bands 11 to 16 are located within azimuth band 10, frequency bands 4 to 10 within azimuth band 11, and frequency bands 1 to 3 within azimuth band 12. The actual azimuth is considered as being accurate within ±2.7°. It will be noted that the intercept of the curve separating bands Nos. 11 and 12 with 8.75 gc. (that is, the juncture of frequency bands 10 and 11) is 27.7°. This value is 2.7° removed from the normal selected value of 25°. Inasmuch as the resolution broadens inherently as the true bearing angle increases, it has been considered desirable to allow this resolution to increase gradually as the true azimuth increases and to accept boundaries for the true azimuth belt which facilitate design of the logic circuitry.

Consider a true azimuth of 35°. As shown in FIG. 8, the intercepts of this 35° coordinate with the curve separating azimuth bands 13 and 14 is 8.375 gc. (boundaries of frequency bands 13 and 14). The intercepts of this coordinate with the curve separating azimuth bands 14 and 15 is 9 gc. (boundary of frequency bands 8 and 9), while the intercept with the curve separating azimuth bands 15 and 16 is approximately 9.625 gc. (boundary of frequency bands 3 and 4). The curve separating azimuth bands 14 and 15 intersects the boundary of frequency bands 13 and 14 at 38.1°. Consequently, it has been considered feasible to make the tolerance at 35° equal to ±3.1°.

The correlation circuitry for 35° is shown in FIG. 9. Frequency lines F13 to F16 are supplied to OR gate 481 and the output combined in AND gate 482 with azimuth band line A13. Frequency lines F9 to F12 are combined in OR gate 483 and the output thereof, together with azimuth band line A14, is applied to AND gate 484. Frequency lines F4 to F8 are connected to OR gate 485 and the output of this gate, together with azimuth band line A15, is connected to AND gate 486. Finally, frequency lines F1 to F3 are supplied to OR gate 487 and the output thereof, along with azimuth band line A16, is connected to AND gate 488. The output of AND gates 482, 484, 486 and 488 are supplied to the final OR gate 489. The 35° true azimuth terminal is disposed in the output circuit of this final OR gate 489.

A representative group of true azimuths, including those already mentioned by way of example, is set forth in Table IX, together with the appropriate logic circuitry. The plus (+) signs indicate an OR operation and the parentheses ( ( ) ) indicate an AND operation.

*Table IX*

| True Bearing Belt | Logic Circuitry |
|---|---|
| 2.5° ±2.5° | A1+A2 (F1+...F12) |
| 5° ±2.5° | A2 (F13+...F16)+A3 (F1+...F12) |
| 7.5° ±2.5° | A3 (F13+...F16)+A4 (F1+...F12) |
| 10° ±2.5° | A4 (F13+...F16)+A5 (F1+...F12) |
| 12.5° ±2.6° | A5 (F13+...F16)+A6 (F1+...F12) |
| 15° ±2.6° | A6 (F13+...F16)+A7 (F1+...F12) |
| 17.5° ±2.6° | A7 (F13+...F16)+A8 (F1+...F12)+A9 (F1+F2) |
| 20° ±2.6° | A8 (F12+...F16)+A9 (F2+...F11)+A10 (F1) F2) |
| 22.5° ±2.5° | A9 (F12+...F16)+A10 (F3+...F11)+A11 (F1+F2+F3) |
| 25° ±2.7° | A10 (F11+...F16)+A11 (F4+...F10)+A12 (F1+F2+F3) |
| 27.5° ±3.0° | A11 (F11+...F16)+A12 (F4+...F10)+A13 (F1+F1+F3) |
| 30° ±3.0° | A12 (F10+...F15)+A13 (F4+...F9)+A14 (F1+F2+F3) |
| 32.5° ±3.1° | A12 (F15+F16)+A13 (F10+...F14)+A14 (F4+...F9)...+A15 (F1+F2+F3) |
| 35° ±3.1° | A13 (F13+...F16)+A14 (F9+...F12)+A15 (F4+...F8)...+A16 (F1+F2+F3) |
| 37.5° ±3.2° | A14 (F13+...F16)+A15 (F8+...F12)+A16 (F4+...F7)...+A17 (F1+F2+F3) |

Table IX—Continued

| True Bearing Belt | Logic Circuitry |
|---|---|
| 40° ±3.6° | A15 (F12+...F16)+A16 (F7+...F11)+A17 (F3+...F6)...+A18 (F1+F2) |
| 42.5° ±3.2° | A15 (F15+F16)+A16 (F11+...F14)+A17 (F6+...F10)...+A18 (F2+...F5)+A19 (F1) |
| 45° ±3.5° | A16 (F14+...F16)+A17 (F10+...F13)+A18 (F6+...F9)...+A19 F1+F5) |
| 47.5° ±3.2° | A17 (F13+...F16)+A18 (F9+...F11)+A19 (F5+...F8)...+A20 (F1+...F4) |
| 50° ±3.6° | A17 (F16)+A18 (F12+...F14)+A19 (F8+...F11)...+A20 (F4+...F7)+A20 (F1+F2+F3) |
| 52.5° ±3.6° | A18 (F14+...F16)+A19 (F10+...F13)+A20 (F7+...F9)...+A21 (F3+...F5)+A22 (F1+F2) |
| 55° ±3.6° | A19 (F11+...F14)+A20 (F9+...F11)+A21 (F6+...F8)...+A22 (F2+...F4)+A23 (F1) |
| 57.5° ±4.2° | A19 (F15+F16)+A20 (F11+...F13)+F21 (F7+...F9)...+A22 (F4+...F6)+A23 (F1+F2+F3) |
| 60° ±4.0° | A20 (F13+F14)+A21 (F10+F11)+A22 (F6+...F8)...+A23 (F3+...F5)+A24 (F1+F2) |
| 62.5° ±5.5° | A20 (F15+F16)+A21 (F11+...F13)+A22 (F8+...F10)...+A23 (F5+F6)+A24 (F1+F3) |
| 67° ±6° | A21 (F14+...F16)+A22 (F10+...F13)+A23 (F7+...F9)...+A24 (F4+...F6)+A25 (F1+F2+F3) |
| 73° ±7° | A22 (F14)+A23 (F10+F11)+A24 (F7+F8)+A25 (F4+F5)...+A26 (F1+F2) |
| 80° ±10° | A22 (F15+F16)+A23 (F12+...F16)+A24 (F9+...F13)...+A25 (F6+...F10)+A26 (F3+...F7)+A27 (F1+...F4)...+A28 (F1) |

It will be noted that certain combinations of frequencies occur for more than one true bearing belt. For example, the combination F1+ . . . F12 occurs for azimuth belts of 2.5°, 5°, 7.5°, 10°, 12.5°, 15° and 17.5°. The logic of the circuitry obviously can be simplified by combining the twelve frequency lines F1, F2, F3 . . . F12 in an OR gate and using the single output line from such OR gate for the first seven true bearing belts. In other words, this single output line could be converted along with azimuth output line A2 to one AND gate, the same output line could be converted along with azimuth output line A3 to another AND gate, and so forth.

It should also be noted that certain combinations of azimuth and frequency occur for more than one true bearing belt. For example, the combination A10, F11, occurs for both 22.5° and 25°. In such a case, the said combination could be assigned to any one of the true bearing belts 22.5° or 25°.

A further refinement of the indicating system described in FIG. 9 involves indication of the quadrant in space within which the target is located. For example, if the indicating equipment of the invention is mounted in an aircraft, the target may be either in front of, to the rear of, or to the left or right of the aircraft. Such quadrant information is provided by a quadrant sensing system of FIG. 10 which includes quadrant phase comparators 47 and 48, each being connected to a pair of antennas. The spacing of antennas 41 and 42 of phase comparison device 47, as well as the spacing of antennas 43 and 44 of phase comparator 48, may be the same as for the first pair of antennas 20 and 21 of the azimuth sensing system. The phase comparators 47 and 48 may be identical in construction with the exception that the antenna pair 41, 42 associated with phase comparator 47 is oriented 90° with respect to the antenna pair 43, 44 associated with phase comparator 48. Each phase comparator includes a 90° phase shift power divider such as a Riblet coupler. The coupler 500 includes a pair of waveguide sections 501 and 502 having a slotted common wall 503. Energy introduced into each of waveguide sections 501 and 502 divides into two substantially equal portions upon passing the apertures 505 in common wall 503; one portion proceeds along the original waveguide section, while the other portion passes through the apertures and thence along the other waveguide section in the same direction. Likewise, coupler 510 includes a pair of waveguide sections 511 and 512 having a common wall 513 containing slots 515. Energy passing through the apertures of each of the couplers undergoes a phase lag of 90°.

At a bearing angle of zero degrees, the phase angle of energy entering the two waveguide sections is zero and energy at the output ends of the waveguide sections is equal and in phase. If the phase angle of energy entering waveguide section 501 of coupler 500 lags the energy waveguide section 502 by less than $\pi$ radians, the energy level at the output end of waveguide section 501 is greater than the output energy level at waveguide section 502. On the other hand, if the phase angle of energy entering waveguide section 502 lags that entering waveguide section 501 by less than $\pi$ radians, the energy level at the output end of waveguide section 502 is greater than the output energy level at section 501. The same relationship applies in the case of energy entering waveguide sections 511 and 512 of coupler 510, where waveguide section 511 corresponds to waveguide section 501 and section 512 corresponds to section 502. The phase angle will be less than $\pi$ radians for all values of bearing angle if the spacing $d_0$ between antennas 41 and 42 of quadrant sensing device 47, and between antennas 43 and 44 of quadrant sensing device 48, is less than one wavelength. The relative phase angle of energy applied to the two waveguide sections 501 and 502 of quadrant sensing device 47 will depend, in turn, upon whether the target lies to the left or right of a line connecting the target with the antenna pair 41, 42. Similarly, the relative phase angle of energy applied to the two waveguide sections 511 and 512 of quadrant sensing device 48 will depend upon whether the target lies forward or aft of the aircraft within which the indicating device of the invention is mounted.

The output ends of the two waveguide arms of quadrant sensing device 47 are connected to a voltage comparator 530 identical in construction and operation to those already used in the azimuth and frequency sensing portions of the system. The voltage comparator 540 is supplied with energy from waveguide sections 511 and 512 of equadrant sensing device 48. The voltage comparator 530 of quadrant sensing device 47 includes diodes 551a and 552a which actually are mounted in the transverse plane respective waveguide sections 501 and 502; likewise, the corresponding diodes 551b and 552b of voltage comparator 540 actually are disposed within the waveguides 511 and 512.

When the target is to the left of a line perpendicular to the antenna pair 41, 42, the output energy level at waveguide section 502 is greater than the output level at waveguide section 501; consequently, diode 552a will conduct more heavily than diode 551a and a positive pulse will be derived at the output line QA of voltage comparator 530. On the other hand, if the target is to the right of the aforementioned line, the energy level at the output of waveguide section 501 exceeds that at the output of waveguide section 502. Diode 551a then will conduct more heavily than diode 552a and a negative pulse will be derived at output line QA.

When the target is in front of the means for carrying the direction finding equipment, according to the invention, the energy level at the output of waveguide section 512 is greater than that at the output of waveguide section 511. Since the voltage comparator in the quadrant sensing device 48 is identical to that in quadrant sensing device 47, a positive pulse will exist at output line QB. However, if the target is behind the aircraft, the level of output energy at waveguide 511 exceeds that at waveguide 512 and a negative pulse will appear on output line QB. Negative pulses at lines QA and QB are converted into positive pulses by means of respective inverters 561 and 562 in the quadrant logic circuit 49. The outputs from quadrant sensing devices 47 and 48 are connected to a group of four AND gates 571 to 574 in quadrant logic circuit 49; these gates are inhibited by negative pulses and are open only when both inputs thereto are positive pulses. If the target is to the left of the indicating system of the invention, postive pulses are supplied to AND gates 571 and 573. If the target is to the right of the aircraft, positive pulses from inverter 561 are supplied to AND gates 572 and 574. If the target is in front of the aircraft, positive pulses are connected to AND gates 571 and 572; on the other hand, if the target is to the rear of the means carrying the system of the invention, positive pulses from inverter 562 are suppied to AND gates 573 and 574.

It is obvious, therefore, that the output line LF of gate 571 will carry a positive pulse when the target is in front of and to the left of the device in which the system of the invention is installed. A positive pulse will appear on line RF of gate 572 when the target is in front of, but to the right of, the aforesaid device. Similarly a left-rear condition is represented by a positive pulse on output line LB and a right-rear condition by a positive pulse on line RB.

Returning now to the correlation matrix 50 of FIG. 9, positive pulses present at any one of the true azimuth terminals may be supplied to one input of a plurality of AND gates. For example, the 2.5° terminal is connected to each of AND gates 495, 496, 497 and 498. These gates are also connected individually with lines LF, RF, LB and RB, respectively, of the quadrant sensing logic circuit 49. Each of the gates 495 to 498 are adapted to provide a positive output pulse when both input lines thereto carry positive pulses. Consequently, if the target is in front of and to the left of the aircraft carrying indicating equipment, the output line LF of quadrant logic circuit 49 will be energized. Consequently, AND gate 495 will be open and the indicator device 52b will be energized. If, however, the target is aft of and to the right of the aircraft, output line RB will carry a positive pulse and gate 498 will be open to provide a positive pulse to the indicator device 52d. Similarly, the output from each of the true azimuth terminals can serve as one input to a like array of four AND gates; the other input for these AND gates is a corresponding one of the output lines LF, RF, LB and RB of quadrant sensing logic circuit 49. The output circuits of each of the AND gates of this array are connected to an individual indicating device, as shown in FIG. 9.

In certain instances, more stringent demands are placed on the resolution of the system of the invention than is possible with the azimuth sensing system arranged as shown in FIGS. 5 and 6. In the case of the more closely spaced antenna pairs, the crossover or null from the associated voltage comparator may be ambiguous over a relatively large azimuth region. In other words, the voltage level at the voltage comparator may be at a level below that at which the azimuth sensing system amplifiers are capable of responding over an azimuth range which is larger than the resolution desired. In such cases, vernier means is added to the azimuth sensing system of FIGS. 5 and 6; the resulting circuit is shown in FIG. 11, wherein elements corresponding to those of FIGS. 5 and 6 are indicated by like reference numerals. The vernier means includes a pair of antennas 626 and 627 whose spacing is equal to the spacing of the next to last pair of antennas 27 and 28 of FIGS. 5 and 6. The antennas 626 and 627 supply energy to the input ends of respective waveguide branches 631 and 632 of a 90° phase shift directional coupler 630 similar in construction and operation to that shown in FIG. 9. Energy passing through the slotted common wall 633 of coupler 630 undergoes a phase lag of 90°.

When the phase angle $\varphi$ of energy at antennas 626 and 627 is 0°, the energy level at the output end of waveguide branches 631 and 632 is equal and the output of voltage comparator 276 (similar in construction and operation to voltage comparators 271 to 275) is a null. In other words, when $\varphi=0$, substantially zero voltage appears on vernier line XX. When $\varphi=\pi/2$—assuming the target is to the right of a line perpendicular to the line connecting antennas 626 and 627—the energy level at the output of waveguide branch 632 is a maximum and the output level at waveguide branch 631 is zero. A binary zero then appears on output line XX of comparator 276. When $\varphi=\pi$ the output energy level at the two waveguide branches 631 and 632 again is equal. At $\varphi=3\pi/2$, the output energy level at waveguide branch 631 is a maximum and the output level at waveguide branch 632 is zero. A binary one is then obtained on output line XX of comparator 276. Table X contains a partial list of the vernier code digits obtained for various bearing angles at output line XX of voltage comparator 276 at 10.0 gc. This table is extended only far enough to divulge the pattern of variation.

*Table X*

| $\varphi$ | Voltage Relationship at Waveguide Branches 631 and 632 | Output of Voltage Comparator 276 | $\varphi/\pi$ | $\theta_x$ | |
|---|---|---|---|---|---|
| 0 | $V_{632}=V_{631}$ | Null | 0 | $\sin^{-1}.1476(0)$ | 0° |
| $\pi/2$ | $V_{632}$ is maximum / $V_{631}$ is minimum | 0 | .5 | $\sin^{-1}.1476(5)$ | 4.2° |
| $\pi$ | $V_{632}=V_{631}$ | Null | 1.0 | $\sin^{-1}.1476$ | 8.5° |
| $3\pi/2$ | $V_{631}$ is maximum / $V_{632}$ is minimum | 1 | 1.5 | $\sin^{-1}.2214$ | 12.8° |
| $2\pi$ | $V_{632}=V_{631}$ | Null | 2.0 | $\sin^{-1}.2952$ | 17.2° |
| $5\pi/2$ | $V_{632}$ is maximum / $V_{631}$ is minimum | 0 | 2.5 | $\sin^{-1}.3690$ | 21.7° |
| $3\pi$ | $V_{632}=V_{631}$ | Null | 3.0 | $\sin^{-1}.4428$ | 26.4° |
| $7\pi/2$ | $V_{631}$ is maximum / $V_{632}$ is minimum | 1 | 3.5 | $\sin^{-1}.5166$ | 31.1° |
| $4\pi$ | $V_{632}=_{631}$ | Null | 4.0 | $\sin^{-1}.5905$ | 36.2° |

From the above Table X, one can construct Table XI listing the vernier code digit corresponding to each azimuth band for the vernier means.

*Table XI*

| Azimuth Band No. | Bearing Angle Range | Binary Code at Line XX |
|---|---|---|
| 1 | 0–2.1° | 0 |
| 2 | 2.1–4.2° | 0 |
| 3 | 4.2–6.4° | 0 |
| 4 | 6.4–8.5° | 0 |
| 5 | 8.5–10.5° | 1 |
| 6 | 10.5–12.8° | 1 |
| 7 | 12.8–15.0° | 1 |
| 8 | 15.0–17.2° | 1 |
| 9 | 17.2–19.4° | 0 |
| 10 | 19.4–21.7° | 0 |
| 11 | 21.7–24.0° | 0 |
| 12 | 24.0–26.4° | 0 |
| 13 | 26.4–28.7° | 1 |
| 14 | 28.7–31.1° | 1 |
| 15 | 31.1–33.6° | 1 |
| 16 | 33.6–36.2° | 1 |
| 17 | 36.2–38.8° | 0 |
| 18 | 38.8–41.6° | 0 |
| 19 | 41.6–44.5° | 0 |
| 20 | 44.5–47.6° | 0 |
| 21 | 47.6–50.8° | 1 |
| 22 | 50.8–54.3° | 1 |
| 23 | 54.3–58.2° | 1 |
| 24 | 58.2–62.3° | 1 |
| 25 | 62.3–67.3° | 0 |
| 26 | 67.3–73.6° | 0 |
| 27 | 73.6–85.1° | 0 |
| 28 | 85.1–90° | 0 |

By comparing Table XI and Table VII, it is evident that the period of variation of crossovers for vernier line XX is the same as that for line DD; the crossovers for the two lines, however, occur at different points. Furthermore, there is a crossover on line XX at the boundary of bands 16 and 17 which is the region at which a crossover for line AA theoretically occurs. Similarly, there are crossovers at vernier line XX at the boundaries of bands 8 and 9 and bands 24 and 25—the region at which crossovers for line BB theoretically occurs. In practice, the region over which a crossover may occur, for line AA, is wider than indicated in Table VII and the extent of this region of ambiguity varies inversely with the amount of separation of the antennas of a given pair. Since the code for the vernier line XX changes more frequently than that of the lines associated with more closely spaced antenna pairs, and since the matter of variation is such that crossovers for the vernier line coincide with crossovers for the other lines, it is possible to minimize the region of ambiguity in crossover so that this region is less than the desired resolution of the system. It should be understood that the azimuth sensing system of FIGS. 5 and 6 is adequate for the resolution set forth previously; it is only in those cases where the resolution must be increased that it is necessary to resort to the modification shown in FIG. 11.

The output appearing on line XX, after amplification in amplifier and pulse stretcher 686, is supplied to an inverter-amplifier 641 and an amplifier 642. If a negative pulse (one) appears at line XX, it will be amplified by amplifier 642 and appear on line 670 as a negative pulse. If the pulse at line XX is a positive pulse (zero), it will be inverted by inverter-amplifier 641 and appear on line 671 as a negative pulse. The vernier pulse on line XX can be either a one or a zero, depending on such factors as the manner of connection of antennas to coupler 630, the manner of connection of diodes in voltage comparator 276, and the like. The AND gates 651 to 653 each are supplied with available energy on the vernier line 670, while the AND gates 654 and 655 each are supplied with energy on vernier line 671; in addition, the output of amplifiers 291 to 293 serve as the other input to respective AND gates 651 to 655. The outputs from AND gates 651 to 655 are applied to a corresponding one of OR gates 661 to 665 by way of respective inverters 691 to 695. Any output of inverter-amplifier 286 also is supplied directly to OR gate 661; similarly, the output of inverter-amplifier 287 is connected directly to OR gates 662 and 664, while inverter-amplifier 288 is connected to OR gates 663 and 665. Each AND gate 651 to 655 is characterized in that it is inhibited when, and only when, a positive pulse appears at one of its two inputs. So long as a binary one appears at a line such as line CC, it will be amplified by inverter-amplifier 288 and will pass through OR gate 665 to line cca. If there is a binary zero at line CC, it will appear, after amplification in amplifier 293, as a positive pulse at AND gates 653 and 655. The latter gates thus are inhibited. If a null appears at line CC, however, the ambiguity in the case of line XX will be substantially less than in the case of line CC. Consequently, there will be either a one or a zero normally at line XX within the region of ambiguity of line CC. For example, referring to Tables VII and XI for Band No. 5, line CC is in the one state and line XX is in the one state. For Band No. 12, line CC is in the one state and line XX is in the zero state; therefore, either state of line XX may be required to define the one state of line CC at the band adjacent a null on line CC. A one will appear as a negative pulse on line 671 and will pass the uninhibited AND gate 655, while a zero will appear as a negative pulse on line 670 and will pass the uninhibited AND gate 653. The output from AND gate 653, after conversion by inverter 693 to a positive pulse, passes OR gate 663 and the line ccb carries a positive pulse, in spite of the fact that operation may be within the region of null ambiguity on line CC. Similarly, an output from AND gate 655, after conversion by inverter 695 to a positive pulse, passes OR gate 665 and the line cca carries a positive pulse. The output of either OR gate 663 or OR gate 665 is used to inhibit AND gate 308. The output of OR gate 663 is applied to AND gates 313 and 317 of the decode logic. See FIG. 6. The output of OR gate 665 is applied to AND gates 312 and 316 of FIG. 6. The assignment of these outputs depends on whether line XX is a zero or one as shown in Tables VII and XI. Similarly, for line BB, the output of AND gate 652 or OR gate 654 is converted to a positive pulse by inverter 692 or 694 to provide an input to OR gates 662 or 664, respectively. The other input to either OR gate 662 or 665 is the BB output of inverter-amplifier 287. The output of OR gates 662 or 664 is used to inhibit AND gate 307. The output of OR gate 662 is applied to AND gate 313, and the output of OR gate 664 is applied to AND gate 316. The output of either gate may be applied to AND gates 314 and 315, since there is no null for line BB for the codes into the gates. Since there is only one null on line AA, the logic can be simplified. When line AA is at null, line XX is in the zero configuration; consequently, only one AND gate, viz., gat 651, is required. The output of AND gate 651, after conversion by inverter 691 to a positive pulse, passes OR gate 661, and the line aa carries a positive pulse. It is obvious, however, that the vernier output is of greatest utility in minimizing the region of ambiguity existing at lines such as AA and BB associated with the more closely spaced antenna pairs, and would provide no increase in resolution for the lines such as DD and EE. In other words, the vernier output at lines 670 and 671 may, in some cases, be confined only to use with line AA or to lines AA and BB. In this instance, the circuitry of FIG. 11 would be correspondingly simplified.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A device for indicating the true bearing of a target emitting electromagnetic wave energy of a predetermined frequency comprising an azimuth sensing system including at least one plurality of pairs of spaced antennas for deriving a first distinctive binary code which depends upon the azimuth of said target as well as upon the frequency of energy emanating from said target, a frequency sensing system for deriving a second distinctive binary code representative of the frequency of energy from said target; and correlation means responsive to said first and second binary codes for providing an output indicative of the true bearing of said target.

2. A device for indicating the true bearing of a target emitting electromagnetic wave energy of a predetermined frequency comprising an azimuth sensing system including at least one plurality of pairs of spaced antennas, the spacing between said antenna pairs being arranged in binary sequence, said azimuth sensing system further including a plurality of phase comparison means each associated with the antennas of a given pair for deriving a first distinctive binary code dependent upon the azimuth of said target as well as upon the frequency of energy emanating from said target, a frequency sensing system for deriving a second distinctive binary code representative of the frequency of energy from said target; and correlation means responsive to said first and second binary codes for providing an output indicative of the true bearing of said target.

3. A device for indicating the true bearing of a target emitting electromagnetic wave energy of a predetermined frequency comprising an azimuth sensing system including at least one plurality of pairs of spaced antennas, the spacing between said antenna pairs being arranged in binary sequence, said azimuth sensing system further including a plurality of phase comparison means each associated with the antennas of a given pair for deriving a first distinctive binary code which depends upon the azimuth of said target as well as upon the frequency of energy emanating from said target, a frequency sensing system for deriving a second distinctive binary code representative of the frequency of energy from said target; quadrant sensing means including at least a pair of spaced antenna elements and means for combining energy received by said antenna elements for deriving information indicative of the quadrant occupied by said target; and correlation means responsive to said first and second binary codes and to said quadrant information for providing an output indicative of the true bearing of said target.

4. A device for indicating the true bearing belt of a target emitting electromagnetic wave energy of a predetermined frequency comprising an azimuth sensing system including at least one plurality of pairs of spaced antennas, the spacing between said antenna pairs being arranged in binary sequence, the relative phase of the energy received from said target by the antennas of a given pair being a function of the bearing of said target as well as the spacing of said antennas of said pair and said predetermined frequency, and circuit means associated with each of said pairs of antennas for deriving a first binary code, said azimuth sensing system further including circuit means for converting said first binary code into an output on a distinct one of a plurality of first output lines each representing a limited range of azimuth which varies with said predetermined frequency; a frequency sensing system responsive to energy from said target for deriving a second binary code representative of a limited frequency band within which the energy from said target falls, said frequency sensing system including circuit means for converting said second binary code into an output appearing on a distinct one of a plurality of second output lines determined by said limited frequency band, and correlation means including several output lines equal to the number of true bearing belts desired and coupled to said first and second output lines for deriving output information on a selected one of said output lines indicative of the true bearing belt within which said target lies.

5. A device for indicating the true bearing belt of a target emitting electromagnetic wave energy of a predetermined frequency comprising an azimuth sensing system including at least one plurality of pairs of spaced antennas, the spacing between said antenna pairs being arranged in binary sequence, said azimuth sensing system further including a plurality of phase comparison means each coupled to both antennas of a given pair of antennas, the relative phase of the energy received from said target by the antennas of a given pair being a function of the bearing of said target, the spacing of said antennas of said pair and said predetermined frequency, said phase comparison means each combining energy from the antennas of a given pair in series and in parallel, and voltage comparison means for deriving a binary output dependent upon which manner of energy combination yields a voltage of greater magnitude, the binary outputs of said voltage comparison means associated with said antenna pairs forming a first binary code, said azimuth sensing system further including circuit means for converting said first binary code into an output on a distinct one of a plurality of first output lines representing a limited range of azimuth which varies with said predetermined frequency; a frequency sensing system for deriving a second binary code representative of a limited frequency band within which the energy from said target falls, said frequency sensing system including circuit means for converting said second binary code into an output appearing on a distinct one of a plurality of second output lines, and correlation means including several output lines equal to the number of true bearing belts desired and coupled to said first and second output lines for deriving output information on a selected one of said output lines indicative of the true bearing belt within which said target lies.

6. A device for indicating the true bearing belt of a target emitting electromagnetic wave energy of a predetermined frequency comprising an azimuth sensing system including at least one plurality of pairs of spaced antennas, the spacing between said antenna pairs being arranged in binary sequence, said azimuth sensing system further including a plurality of comparison means each coupled to both antennas of a given pair of antennas, the relative phase of the energy received from said target by the antennas of a given pair being a function of the bearing of said target and the spacing of said antennas of said pair and said predetermined frequency, said comparison means each combining energy from the antennas of a given pair, voltage comparison means for deriving a binary output on a corresponding line, the binary outputs of said voltage comparison means associated with said antenna pairs forming a first binary code, said azimuth sensing system including at least one vernier means for deriving a single digit binary code, said vernier means including a pair of antennas spaced a distance equal to the spacing of one of the widely separated antenna pairs, voltage comparison means for deriving a vernier binary output which changes from one state to the other with azimuth more rapidly than the binary output from the voltage comparison means associated with the more closely spaced antenna pairs, and means for combining said vernier output with information on at least one of said corresponding lines to convert said first binary code into an output on a distinct one of a plurality of first output lines representing a limited range of azimuth which varies with said predetermined frequency; a frequency sensing system for deriving a second binary code representative of a limited frequency band within which the energy from said target falls, said frequency sensing system including circuit means for converting said second binary code into an output appearing on a distinct one of a plurality of second output lines, and correlation means including several output lines equal to the number of true bearing belts desired and coupled to said first and second output lines for deriving output information on a selected one of said output lines indicative of the true bearing belt within which said target lies.

References Cited by the Examiner

UNITED STATES PATENTS

| 2,840,812 | 6/58 | Di Giacomo | 343—118 |
| 3,039,094 | 6/62 | Anderson | 343—113 |

CHESTER L. JUSTUS, *Primary Examiner.*